United States Patent
Mori et al.

(10) Patent No.: US 10,666,163 B2
(45) Date of Patent: May 26, 2020

(54) ELECTRIC-POWER CONVERSION APPARATUS

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/093,208

(22) PCT Filed: Jun. 22, 2016

(86) PCT No.: PCT/JP2016/068472
§ 371 (c)(1),
(2) Date: Oct. 12, 2018

(87) PCT Pub. No.: WO2017/221339
PCT Pub. Date: Dec. 28, 2017

(65) Prior Publication Data
US 2019/0131887 A1 May 2, 2019

(51) Int. Cl.
| | | |
|---|---|---|
| *H02M 7/5387* | (2007.01) |
| *H02P 27/08* | (2006.01) |
| *H02P 21/22* | (2016.01) |
| *H02M 1/08* | (2006.01) |
| *H02M 7/5395* | (2006.01) |
| *H02M 1/44* | (2007.01) |
| *H02M 1/00* | (2006.01) |

(52) U.S. Cl.
CPC ......... *H02M 7/53871* (2013.01); *H02M 1/08* (2013.01); *H02M 1/44* (2013.01); *H02M 7/5395* (2013.01); *H02P 21/22* (2016.02); *H02M 2001/0009* (2013.01); *H02M 2007/53876* (2013.01); *H02P 27/08* (2013.01)

(58) Field of Classification Search
CPC ..... H02M 7/53871; H02M 2001/0009; H02M 1/08; H02P 27/08; H02P 21/22
See application file for complete search history.

(56) References Cited

FOREIGN PATENT DOCUMENTS

JP 2003-079157 A 3/2003

*Primary Examiner* — Kawing Chan
*Assistant Examiner* — Bradley R Brown
(74) *Attorney, Agent, or Firm* — Sughrue Mion, PLLC; Richard C. Turner

(57) ABSTRACT

Voltage commands of respective phases are substantially equally shifted in such a way that a maximum-phase voltage command coincides with the maximum value of a PWM carrier signal and are compared with the PWM carrier signal, so that a voltage is controlled; in addition to that, a current detection value corresponding to the phase where the lower-arm switching device is turned on is corrected based on a current detection value corresponding to the phase where the upper-arm switching device is turned on.

20 Claims, 13 Drawing Sheets

FIG. 6

| Sup | Sun | Svp | Svn | Swp | Swn | VOLTAGE VECTOR |
|---|---|---|---|---|---|---|
| 0 | 1 | 0 | 1 | 0 | 1 | V0 |
| 1 | 0 | 0 | 1 | 0 | 1 | V1 |
| 1 | 0 | 1 | 0 | 0 | 1 | V2 |
| 0 | 1 | 1 | 0 | 0 | 1 | V3 |
| 0 | 1 | 1 | 0 | 1 | 0 | V4 |
| 0 | 1 | 0 | 1 | 1 | 0 | V5 |
| 1 | 0 | 0 | 1 | 1 | 0 | V6 |
| 1 | 0 | 1 | 0 | 1 | 0 | V7 |

ELECTRIC-POWER CONVERSION APPARATUS

CROSS REFERENCE TO RELATED APPLICATIONS

This application is a National Stage of International Application No. PCT/JP2016/068472, filed on Jun. 22, 2016.

TECHNICAL

The present invention relates to an electric-power conversion apparatus including a three-phase voltage-type inverter to be PWM-controlled.

BACKGROUND ART

In general, in as electric-power conversion apparatus including a three-phase voltage-type inverter to be PWM (Pulse Width Modulation)-controlled, turning-on/off of switching devices provided in the upper arm and the lower arm of each phase is PWM-controlled, based on the output current value (referred to as a current detection value, hereinafter) of each phase, of the electric-power conversion apparatus, that is detected by a current detector; thus, the voltage is controlled in such a way as to keep track of a voltage command value.

In the foregoing current detector, the reference electric potential that is common in the respective phases out of the three phases is set to the ground potential, in general. Accordingly, noise that intrudes in the current detection value of each phase includes much components that are in-phase among the respective phased out of the three phase, i.e., zero-phase components.

In this situation, in the region where the amplitude of the foregoing voltage command value is small, the foregoing current detector can obtain the respective current detection values of all the phases out of the three phases. Thus, when the respective current detection values of all the phases out of three phases are converted into, for example, two axes in a stationary biaxial coordinate system or a rotating biaxial coordinate system, no zero-phase component included in the current detection value appears; therefore, it is made possible that without undergoing the effect of the zero-phase components included in noise, high-accuracy voltage control can be performed based on the current detection value corresponding to an output current flowing in the three-phase voltage-type inverter.

However, in the case where in the region where the amplitude of the forgoing voltage command value is large, the respective phases out of the three phases are tentatively referred to as "a maximum phase", "a middle phase", and "a minimum phase" in decreasing order in size of the voltage command values for the respective phases out of the three phases, the time in which the switching device in the lower arm of the maximum phase is turned on is shorter than a time necessary for the current detector to detect a correct current detection value; thus, because the current detector cannot detect the correct, current detection value of the maximum phase, the foregoing high-accuracy voltage control based on the current detection value may not be performed.

To date, there has been disclosed a technology in which in a three-phase voltage-type inverter to be PWM-controlled, there are selected, every one period of a carrier wave in the PWM control, any two phases, in each of which the off time, based on the PWM control, of the lower arm is shorter than the off times of the other phases, in which the current detector concurrently detects energization currents to the respective lower arms of the selected two phases, and in which the current detection values, as the output current values of the inverter, are utilized in the PWM control (for example, refer to Patent Document 1).

It is allegedly claimed that the conventional three-phase voltage-type inverter disclosed in Patent Document 1 makes it possible that the energization currents of two suitable phases are concurrently detected every predetermined period and that the values based on the current detection values are dealt with, for example, as the instantaneous current vectors in vector control of an AC motor.

PRIOR ART REFERENCE

Patent Document

Patent Document 1: Japanese Patent Application Laid-Open No. 2003-79157

DISCLOSURE OF THE INVENTION

Problems to be Solved by the Invention

In the case of the three-phase voltage-type inverter, as a conventional electric-power conversion apparatus, disclosed in foregoing Patent Document 1, the energization currents to the respective lower arms of the selected two phases are concurrently detected by the current detector, and then the current detection values are utilized, as the output current values of the inverter, in the PWM control; however, because only the energization currents of the two phases are detected, zero-phase noise components appear even when the current detection values are converted into the two axes in a stationary biaxial coordinate system or a rotating biaxial coordinate system.

Accordingly, in the conventional electric-power conversion apparatus disclosed in Patent Document 1, no accurate current detection value corresponding to the output current of the three-phase voltage-type inverter can be obtained and hence it is difficult to perform accurate output control while keeping track of the voltage command value; thus, in the case where as the load, for example, a three-phase AC rotating electric machine is connected, the conventional electric-power conversion apparatus has in some cases caused a torque ripple, a vibration, and a noise sound in the three-phase AC rotating electric machine to increase.

The present invention has been implemented in order to solve the foregoing problems in conventional electric-power conversion apparatuses; the objective thereof is to provide an electric-power conversion apparatus that makes it possible that even in the region where the amplitude of the voltage command value is large, high-accuracy control based on the current detection value is performed without undergoing the effect of zero-phase noise.

Means for Solving the Problems

An electric-power conversion apparatus according to the present invention includes
a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device, a current detector that detects a current flowing in the lower-arm switching device of each of the three phases in the three-phase inverter and then outputs a current detection value corresponding to the current, and a control apparatus that performs PWM control of the upper-arm switching device and the lower-arm switching device in the three-phase inverter, based on the current detection value outputted from the current detector; the electric-power conversion apparatus is characterized in that the current detector detects the current and then outputs the current detection value at a time when there occurs an effective voltage vector in which the switching device of one phase or the switching devices of two phases in one group of the upper-arm switching devices and the lower-arm switching devices of the respective phases in the three-phase inverter are turned on and the switching devices of two phases or the switching device of one phase in the other group of the upper-arm switching devices and the lower-arm switching devices of the respective phases in the three-phase inverter are turned on, as the case may be, and in that the control apparatus is configured in such a way that when respective voltage commands of the three phases for providing a command of the voltage are classified into a maximum-phase voltage command, a middle-phase voltage command, and a minimum-phase voltage command in that decreasing order, the maximum-phase voltage command, the middle-phase voltage command, and the minimum-phase voltage command are substantially equally shifted so that the maximum-phase voltage command coincides with the maximum value of a PWM carrier signal in the PWM control, and then the voltage is controlled based on comparisons between the PWM carrier signal in the PWM control and the maximum-phase voltage command, the middle-phase voltage command, and the minimum-phase voltage command that have been shifted, and in such a way that the current detection value corresponding to the phase where the lower-arm switching device is turned on is corrected based on the current detection value corresponding to the phase where the upper-arm switching device is turned on.

An electric-power conversion apparatus according to the present invention includes a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device, a current detector that detects a current flowing in the lower-arm switching device of each of the three phases in the three-phase inverter and then outputs a current detection value corresponding to the current, and a control apparatus that performs PWM control of the upper-arm switching device and the lower-arm switching device in the three-phase inverter, based on the current detection value outputted from the current detector; the electric-power conversion apparatus is characterized in that when respective voltage commands of the three phases for providing a command of the voltage are classified into a maximum-phase voltage command, a middle-phase voltage command, and a minimum-phase voltage command in that decreasing order, the current detector detects the current and then outputs the current detection value at a time point when there occurs an effective voltage vector in which the upper-arm switching device, in the inverter, that corresponds to the maximum-phase voltage command is turned on and the respective lower-arm switching devices that correspond to the middle-phase voltage command and the minimum-phase voltage command are turned on, and in that the control apparatus is configured in such a way as to control the voltage, based on comparisons between a PWM carrier signal in the PWM control and the respective voltage commands of three phases for providing a command of the voltage, and in such a way as to correct the current detection value corresponding to the middle-phase voltage command and the current detection value corresponding to the minimum-phase voltage command, based on the current detection value corresponding to the maximum-phase voltage command.

Moreover, an electric-power conversion apparatus according to the present invention includes a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device, a current detector that detects a current flowing in the lower-arm switching device of each of the three phases in the three-phase inverter and then outputs a current detection value corresponding to the current, and a control apparatus that performs PWM control of the upper-arm switching device and the lower-arm switching device in the three-phase inverter, based on the current detection value outputted from the current detector; the electric-power conversion apparatus is characterized in that when respective voltage commands of the three phases for providing a command of the voltage are classified into a maximum-phase voltage command, a middle-phase voltage command, and a minimum-phase voltage command in that decreasing order, the current detector detects the current and then outputs the current detection value at a time point when there occurs an effective voltage vector in which the respective upper-arm switching devices corresponding to the maximum-phase voltage command and the middle-phase voltage command are turned on and the lower-arm switching device corresponding to the minimum-phase voltage command is turned on, and in that the control apparatus corrects the current detection value corresponding to the minimum-phase voltage command with the current detection value corresponding to the maximum-phase voltage command or the middle-phase voltage command.

An electric-power conversion apparatus according to the present invention includes two three-phase inverters that apply respective voltages to two sets of three-phase windings in a three-phase AC rotating electric machine having the two sets of three-phase windings, a current detector that detects a current flowing in the lower-arm switching device of each of the three phases in each of the two three-phase inverters and then outputs a current detection value corresponding to the current, and a control apparatus that performs PWM control of the upper-arm switching devices and the lower-arm switching devices in the two three-phase inverters, based on the current detection values outputted from the current detector; the electric-power conversion apparatus is characterized in that each of the two three-phase inverters is configured in such a way that an upper-arm switching device and a lower-arm switching device connected in series with each other are provided for each of three phases, in such a way that a DC power source is connected across the upper-arm switching device and the lower-arm switching device connected in series with each other, and in such a way that a voltage is applied to a three-phase AC rotating electric machine connected with a series connection portion between the upper-arm switching device and the lower-arm switching device, in that the current detector detects the current and then outputs the current detection value during a time in which there occurs an effective voltage vector in which the switching device of one phase or the switching devices of two phases in the upper-arm switching devices of the respective phases in each of the two three-phase inverter are turned on and the switching devices of two phases or the switching device of one phase in the lower-arm switching devices of the respective phases in the three-phase inverter are turned on, as the case may be, and in that the control apparatus corrects the current detection value corresponding to the phase where the lower-arm switching device in one of the two three-phase inverters is turned on, based on the current detection value corresponding to the phase where the upper-arm switching device in the other one of the two three-phase inverters is turned on.

An electric-power conversion apparatus according to the present invention includes a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device, a current detector that detects a current flowing in the lower-arm switching device of each of the three phases in the three-phase inverter and then outputs a current detection value corresponding to the current, and a control apparatus that performs PWM control of the upper-arm switching device and the lower-arm switching device in the three-phase inverter, based on the current detection value outputted from the current detector; the electric-power conversion apparatus is characterized in that the current detector detects the current and then outputs the current detection value at a time when there occurs an effective voltage vector in which the switching device of one phase or the switching devices of two phases in one group of the upper-arm switching devices and the lower-arm switching devices of the respective phases in the three-phase inverter are turned on and the switching devices of two phases or the switching device of one phase in the other group of the upper-arm switching devices and the lower-arm switching devices of the respective phases in the three-phase inverter are turned on, as the case may be, and in that the control apparatus is configured.

in such a way that when respective voltage commands of the three phases for providing a command of the voltage are classified into a maximum-phase voltage command, a middle-phase voltage command, and a minimum-phase voltage command in that decreasing order, the maximum-phase voltage command, the middle-phase voltage command, and the minimum-phase voltage command are substantially equally shifted so that the minimum-phase voltage command coincides with the minimum value of a PWM carrier signal in the PWM control, and then the voltage is controlled based on comparisons between the PWM carrier signal in the PWM control and the middle-phase voltage command and the minimum-phase voltage command that have been shifted, and.

in such a way that the current detection value corresponding to the phase where the upper-arm switching device is turned on is corrected based on the current detection value corresponding to the phase where the lower-arm switching device is turned on.

Still moreover, an electric-power conversion apparatus according to the present invention includes a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device, a current detector that detects a current flowing in the lower-arm switching device of each of the three phases in the three-phase inverter and then outputs a current detection value corresponding to the current, and a control apparatus that performs PWM control of the upper-arm switching device and the lower-arm switching device in the three-phase inverter, based on the current detection value outputted from the current detector; the electric-power conversion apparatus is characterized in that when respective voltage commands of the three phases for providing a command of the voltage are classified into a maximum-phase voltage command, a middle-phase voltage command, and a minimum-phase voltage command in that decreasing order, the current detector detects the current and then outputs the current detection value at a time point when there occurs an effective voltage vector in which the lower-arm switching device corresponding to the minimum-phase voltage command is turned on and the respective lower-arm switching devices corresponding to the middle-phase voltage command and the maximum-phase voltage command are turned on, and in that the control apparatus corrects the current detection value corresponding to the middle-phase voltage command and the current detection value corresponding to the maximum-phase voltage command, based on the current detection value corresponding to the minimum-phase voltage command.

Moreover, an electric-power conversion apparatus according to the present invention includes a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device, a current detector that detects a current flowing in the lower-arm switching device of each of the three phases in the three-phase inverter and then outputs a current detection value corresponding to the current, and a control apparatus that performs PWM control of the upper-arm switching device and the lower-arm switching device in the three-phase inverter, based on the current detection value outputted from the current detector; the electric-power conversion apparatus is characterized in that when respective voltage commands of the three phases for providing a command of the voltage are classified into a maximum-phase voltage command, a middle-phase voltage command, and a minimum-phase voltage command in that decreasing order, the current detector detects the current and then outputs the current detection value at a time point when there occurs an effective voltage vector in which the respective lower-arm switching devices corresponding to the minimum-phase voltage command and the middle-phase voltage command are turned on and the upper-arm switching device corresponding to the maximum-phase voltage command is turned on, and in that the control apparatus corrects the current detection value corresponding to the maximum-phase voltage command, based on the current detection value corresponding to the minimum-phase voltage command or the middle-phase voltage command.

An electric-power conversion apparatus according to the present invention includes two three-phase inverters that apply respective voltages to two sets of three-phase windings in a three-phase AC rotating electric machine having the two sets of three-phase windings, a current detector that detects a current flowing in the upper-arm switching device of each of the three phases in each of the two three-phase inverters and then outputs a current detection value corresponding to the current, and a control apparatus that performs PWM control of the upper-arm switching devices and the lower-arm switching devices in the two three-phase inverters, based on the current detection values outputted from the current detector; the electric-power conversion apparatus is characterized in that each of the two three-phase inverters is configured in such a way that an upper-arm switching device and a lower-arm switching device connected in series with each other are provided for each of three phases, in such a way that a DC power source is connected across the upper-arm switching device and the lower-arm switching device connected in series with each other, and in such a way that a voltage is applied to a three-phase AC rotating electric machine connected with a series connection portion between the upper-arm switching device and the lower-arm switching device, in that the current detector detects the current and then outputs the current detection value during a time in which there occurs an effective voltage vector in which the switching device of one phase or the switching devices of two phases in the upper-arm switching devices of the respective phases in each of the two three-phase inverter are turned on and the switching devices of two phases or the switching device of one phase in the lower-arm switching devices of the respective phases in the three-phase inverter are turned on, as the case may be, and in that the control apparatus corrects the current detection value corresponding to the phase where the upper-arm switching device in one of the two three-phase inverters is turned on, based on the current detection value corresponding to the phase where the lower-arm switching device in the other one of the two three-phase inverters is turned on.

Advantage of the Invention

An electric-power conversion apparatus according to the present invention makes it possible that even in the region where the amplitude of a voltage command value is large, high-accuracy control based on a current detection value is performed without undergoing the effect of zero-phase noise signals that are inphase in each of the three phases; thus, malfunctions such as a torque ripple, a vibration, and a noise sound in a three-phase AC rotating electric machine can be reduced.

BRIEF DESCRIPTION OF THE DRAWINGS

FIG. 6 is an explanatory table representing respective voltage vectors for the operation patterns of the switching devices in the three-phase inverter in the electric-power conversion apparatus according to Embodiment 1 of the present invention;

BEST MODE FOR CARRYING OUT THE INVENTION

Embodiment 1

Figure 1:
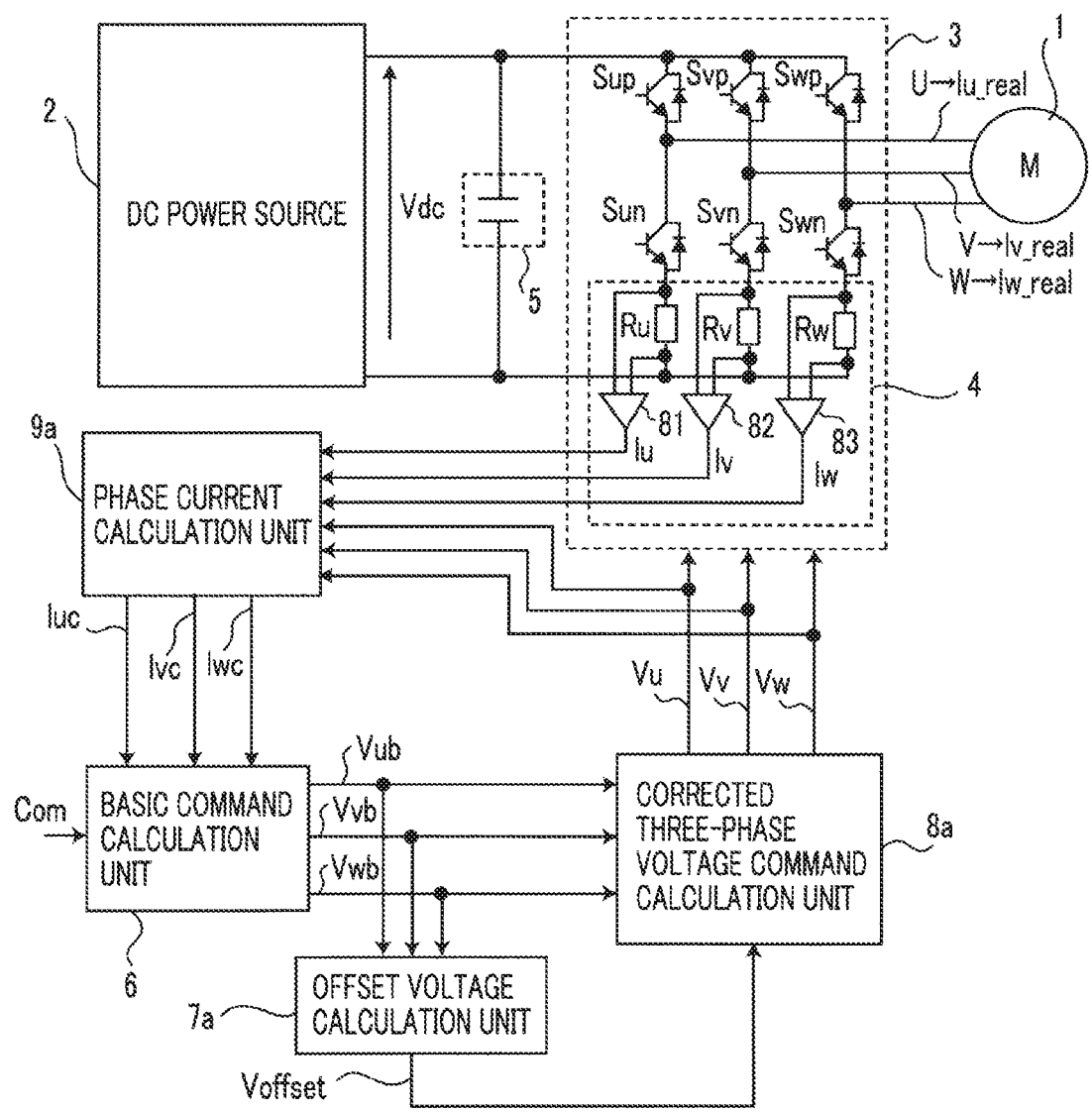
FIG. 1 is an overall configuration diagram of an electric-power conversion apparatus according to Embodiment 1 of the present invention.

FIG. 1 is an overall configuration diagram of an electric-power conversion apparatus according to Embodiment 1 of the present invention. In FIG. 1, the electric-power conversion apparatus according to Embodiment 1 of the present invention is provided with a three-phase inverter 3, a current detector 4, a smoothing capacitor 5, a basic command calculation unit 6, an offset voltage calculation unit 7a, a corrected three-phase voltage command calculation unit 8a, and a phase current calculation unit 9a. The basic command calculation unit 6, the offset voltage calculation unit 7a, the corrected three-phase voltage command calculation unit 8a, and the phase current calculation unit 9a are included in a control apparatus in the electric-power conversion apparatus; the control apparatus is configured with a microcomputer that operates based on predetermined program.

The positive-polarity terminal and the negative-polarity terminal of the three-phase inverter 3 are connected with the positive-polarity side and the negative-polarity side, respectively, of a DC power source 2. A U-phase terminal U, V-phase terminal V, and a W-phase terminal W of the three-phase inverter 3 are connected with the U-phase terminal, V-phase terminal, and W-phase terminal, respectively, of the three-phase AC rotating electric machine 1 as a load. The three-phase inverter 3 is formed of a three-phase bridge circuit and is provided with a U-phase arm including a series connection member configured with a U-phase upper arm and a U-phase lower arm, a V-phase arm including a series connection member configured with a V-phase upper arm and a V-phase lower arm, and a W-phase arm including a series connection member configured with a W-phase upper arm and a W-phase lower arm.

In each of Embodiment 1 and after-mentioned Embodiments 2 through 5, the explanation will be made under the assumption that the DC power source 2 is formed of a DC power source that outputs a DC voltage Vdc of 10 [V].

A U-phase upper arm switching device Sup, as a first switching device, is connected with the U-phase upper arm; a U-phase lower arm switching device Sun, as a second switching device, is connected with the U-phase lower arm; a V-phase upper arm switching device Svp, as a third switching device, is connected with the V-phase upper arm; a V-phase lower arm switching device Svn, as a fourth switching device, is connected with the V-phase lower arm; a W-phase upper arm switching device Swp, as a fifth switching device, is connected with the W-phase upper arm; a W-phase lower arm switching device Swn, as a sixth switching device, is connected with the W-phase lower arm.

Each of the foregoing U-phase upper arm switching device Sup, the U-phase lower arm switching device Sun, the V-phase upper arm switching device Svp, the V-phase lower arm switching device Svn, the W-phase upper arm switching device Swp, and the W-phase lower arm switching device Swn is formed of a diode and a semiconductor switch, such as an IGBT, a bipolar transistor, or a MOS power transistor, that are connected with each other in an anti-parallel manner.

In the three-phase inverter 3, the U-phase upper arm switching device Sup, the U-phase lower arm switching device Sun, the V-phase upper arm switching device Svp, the V-phase lower arm switching device Svn, the W-phase upper arm switching device Swp, and the W-phase lower arm switching device Swn are PPM (Pulse Width Modulation)-controlled in the carrier period Tc of, for example, 50 [µs], based on the DC voltage Vdc inputted from the DC power source 2 and a U-phase voltage command Vu, a V-phase voltage command Vv, and W-phase voltage command Vw configured of an after-mentioned corrected three-phase AC voltage; thus, the On duty of each of the switching devices is controlled.

Based on after-mentioned PWM control, the three-phase inverter 3 generates a three-phase AC voltage from the U-phase terminal U, the V-phase terminal V, and the W-phase terminal W. A U-phase voltage outputted from the U-phase terminal of the three-phase inverter is applied to the U-phase winding of the three-phase AC rotating electric machine 1; a V-phase voltage outputted from the V-phase terminal of the three-phase inverter 3 is applied to the V-phase winding of the three-phase AC rotating electric machine 1; a W-phase voltage outputted from the W-phase terminal of the three-phase inverter 3 is applied to the W-phase winding of the three-phase AC rotating electric machine 1. As a result, the U-phase winding of the three-phase AC rotating electric machine 1 is energized with a U-phase current Iu_real; the V-phase winding is energized with a V-phase current. Iv_real; the W-phase winding is energized with a W-phase current Iw_real.

The three-phase AC rotating electric machine 1 having the U-phase winding, the V-phase winding, and the W-phase winding is formed for example, a permanent-magnet synchronous rotating electric machine, a field-winding synchronous rotating electric machine, an induction rotating electric machine, or a synchronous reluctance motor. The DC power source 2 outputs the DC voltage Vdc to the three-phase inverter 3. As the DC power source 2, any apparatus, such as a battery, a DC-DC converter, a diode rectifier, or a PWM rectifier, that can output a DC voltage can be utilized.

In the case where it converts DC electric power, which is the output of the DC power source 2, into three-phase AC electric power and supplies the three-phase AC electric power to the three-phase AC rotating electric machine 1, the three-phase inverter 3 operates as a so-called DC/AC converter, i.e., an inverter as a forward converter, and in the case where when the three-phase AC rotating electric machine 1 operates as an electric power generator, it converts generated three-phase AC electric power into DC electric power and supplies the DC electric power to the DC power source 2, the three-phase inverter 3 operates as a so-called AC/DC converter, i.e., a converter as an inverse converter; however, for the convenience of explanation, the following explanation will be made, while collectively referring the three-phase inverter 3 as an "inverter".

The smoothing capacitor 5 is a capacitor for stabilizing the DC voltage Vdc between the positive polarity and the negative polarity of the DC power source 2 and is connected between the positive-polarity terminal and the negative-polarity terminal of the three-phase inverter 3.

The current detector 4 is provided with a U-phase current detection resistor Ru connected in series with the U-phase lower arm switching device Sun, a V-phase current detection resistor Rv connected in series with the V-phase lower arm switching device Svn, and a W-phase current detection resistor Rw connected in series with the W-phase lower arm switching device Swn and with a first amplifier 81, a second amplifier 82, and a third amplifier 83, each of which is formed of an operational amplifier or like that.

The first amplifier 81 amplifies a voltage across the U-phase current detection resistor Ru and outputs the voltage, as a U-phase current detection value Iu that corresponds to the U-phase current of the three-phase inverter 3. The second amplifier 82 amplifies a voltage across the V-phase current detection resistor Rv and outputs the voltage, as a V-phase current detection value Iv that corresponds to the V-phase current of the three-phase inverter 3. The third amplifier 83 amplifies a voltage across the W-phase current detection resistor Rw and outputs the voltage, as a W-phase current detection value Iw that corresponds to the W-phase current of the three-phase inverter 3. The a U-phase current detection value Iu, the V-phase current detection value Iv, and the W-phase current detection value Iw that are outputted from the current detector 4 are each inputted to the phase current calculation unit 9a, described later.

Through arithmetic operations, the basic command calculation unit 6 calculates the U-phase voltage command Vub, the V-phase voltage command Vvb, and the W-phase voltage command Vwb, as the three-phase voltage commands, and inputs the foregoing voltage commands Vub, Vvb, and Vwb to the corrected three-phase voltage command calculation unit 8a and the offset voltage calculation unit 7a, which will be described later.

Based on the U-phase voltage command Vub, the V-phase voltage command Vvb, and the W-phase voltage command Vwb, as the three-phase voltage commands, that are outputted from the basic command calculation unit 6, the offset voltage calculation unit 7a calculates and outputs an offset voltage Voffset.

Figure 2:
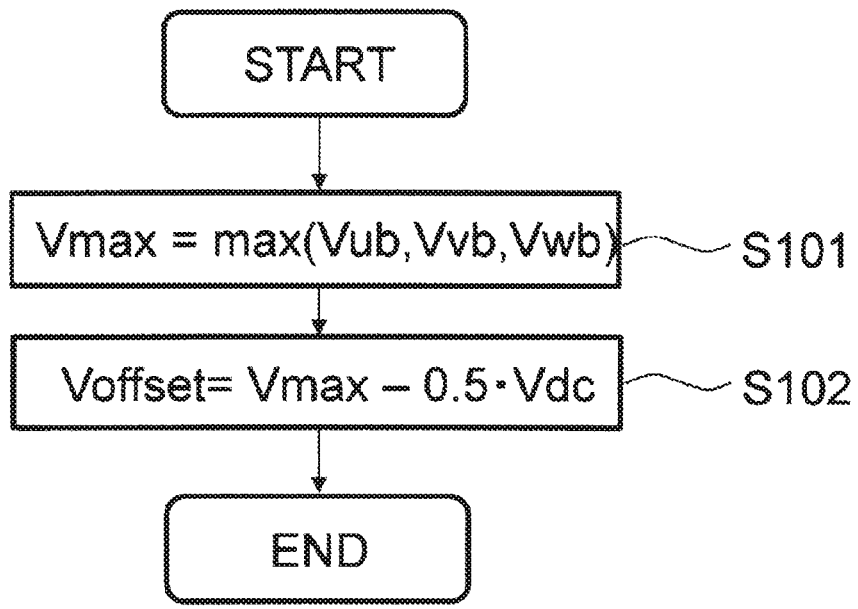
FIG. 2 is a flowchart representing the calculation procedure of an offset voltage calculation unit in the electric-power conversion apparatus according to Embodiment 1 of the present invention.

In this situation, the calculation procedure of the offset voltage calculation unit 7a will be explained. FIG. 2 is a flowchart representing the calculation procedure of the offset voltage calculation unit in the electric-power conversion apparatus according to Embodiment 1 of the present invention. In FIG. 2, at first, in the step S101, there is calculated a maximum-phase voltage command Vmax at a time when the respective phases of the U-phase voltage command Vub, the V-phase voltage command Vvb, and the W-phase voltage command Vwb are classified into the maximum phase, the middle phase, and the minimum phase, based on the magnitude of the foregoing voltage commands Vub, Vvb, and Vwb. Subsequently, in the step S102, a value obtained by multiplying the DC voltage Vdc of the DC power source 2 by a constant [0.5] is subtracted from the maximum-phase voltage command Vmax obtained in the step S101, so that the offset voltage Voffset is calculated.

In FIG. 1, based on the U-phase voltage command Vub, the V-phase voltage command Vvb, and the W-phase voltage command Vwb, as the three-phase voltage commands, and the offset voltage Voffset from the offset voltage calculation unit 7a, the corrected three-phase voltage command calculation unit 8a calculates and outputs a corrected U-phase voltage command Vu, a corrected V-phase voltage command Vv, and a corrected W-phase voltage command Vw, as corrected three-phase voltage commands.

Figure 3:
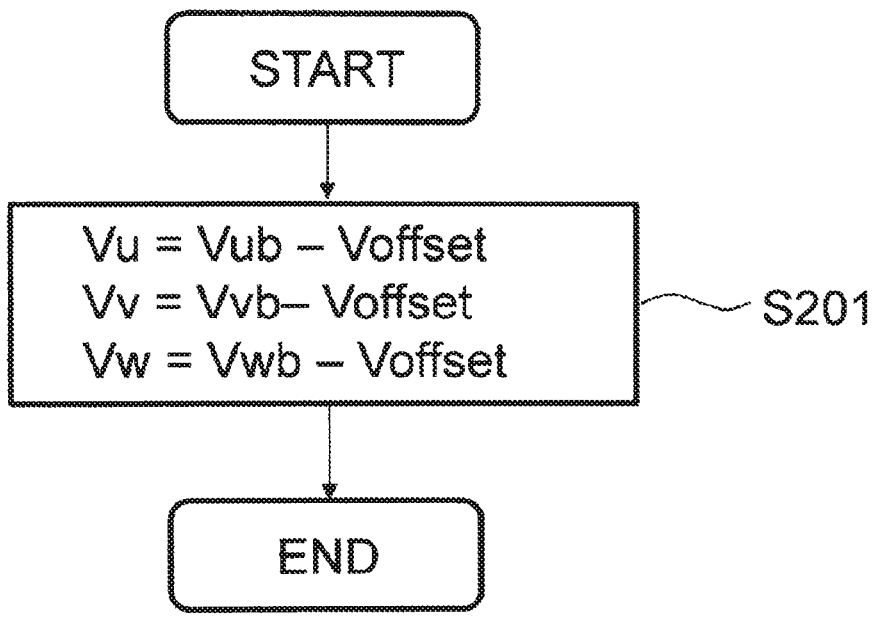
FIG. 3 is a flowchart representing the calculation procedure of a corrected three-phase voltage command calculation unit in the electric-power conversion apparatus according to Embodiment 1 of the present invention.

In this situation, the calculation procedure of the corrected three-phase voltage command calculation unit 8a will be explained. FIG. 3 is a flowchart representing the calculation procedure of the corrected three-phase voltage command calculation unit in the electric-power conversion apparatus according to Embodiment 1 of the present invention in FIG. 3, in the step S201, the offset voltage Voffset inputted from the offset voltage calculation unit 7a is subtracted from each of the U-phase voltage command Vub, the V-phase voltage command Vvb, and the W-phase voltage command Vwb, as the three-phase voltage commands, inputted from the basic command calculation unit 6, so that the corrected U-phase voltage command Vu, the corrected V-phase voltage command Vv, and the corrected W-phase voltage command Vw, as the corrected three-phase voltage commands, are calculated.

Next, in FIG. 1, the corrected U-phase voltage command Vu, the corrected V-phase voltage command Vv, and the corrected. W-phase voltage command Vw, as the corrected three-phase voltage commands, that are calculated by the corrected three-phase voltage command calculation unit 8a are inputted to the inverter 3. In the inverter 3, the corrected U-phase voltage command Vu, the corrected V-phase voltage command Vv, and the corrected W-phase voltage command Vw, as the corrected three-phase voltage commands, that are inputted from the corrected three-phase voltage command calculation unit 8a are each compared with the PWM carrier signal and then are converted into driving signals for the U-phase upper arm switching device Sup, the U-phase lower arm switching device Sun, the V-phase upper arm switching device Svp, the V-phase lower arm switching device Svn, the W-phase upper arm switching device Swp, and the W-phase lower arm switching device Swn. As far as the PWM carrier signal is concerned, the maximum value is equal to the output upper limit value of the inverter 3; the lower limit value is equal to the output lower limit value of the inverter 3; the period is configured of a triangular wave signal having a carrier period of Tc.[0040]

Meanwhile, the corrected U-phase voltage command Vu, the corrected V-phase voltage command Vv, and the corrected W-phase voltage command Vw, as the corrected three-phase voltage commands, that are outputted from the corrected three-phase voltage command calculation unit 8a are inputted also to the phase current calculation unit 9a. Based on the a U-phase current detection value Iu, the V-phase current detection value Iv, and the W-phase current detection value Iw that are inputted from the current detector 4, described above, and the corrected U-phase voltage command Vu, the corrected V-phase voltage command Vv, and the corrected W-phase voltage command Vw, as the corrected three-phase voltage commands, that are outputted from the corrected three-phase voltage command calculation unit 8a, the phase current calculation unit 9a calculates a corrected U-phase current detection value Iuc, a corrected V-phase current detection value Ivc, and a corrected W-phase current detection value Iwc, as corrected current detection values, through arithmetic operations, and inputs them to the basic command calculation unit 6.

Based on a control command Com from the outside and the corrected U-phase current detection value Iuc, the corrected V-phase current detection value Ivc, and the corrected W-phase current detection value Iwc, as the corrected current detection values, that are inputted from the phase current calculation unit 9a, the basic command calculation unit 6 calculates the U-phase voltage command Vub, the V-phase voltage command Vvb, and the W-phase voltage command Vwb, as the three-phase voltage commands, through arithmetic operations and outputs them.

As the calculation method in which the basic command calculation unit 6 calculates the U-phase voltage command Vub, the V-phase voltage command Vvb, and the W-phase voltage command Vwb, as the three-phase voltage commands, there can be utilized a calculation method based on a so-called V/F control in which after a speed command (frequency) f, as the control command Com from the outside, for the three-phase AC rotating electric machine 1 is set, the respective amplitudes of the U-phase voltage command Vub, the V-phase voltage command Vvb, and the W-phase voltage command Vwb, as the three-phase voltage commands, are determined.

As the calculation method in which the basic command calculation unit 6 calculates the U-phase voltage command Vub, the V-phase voltage command Vvb, and the W-phase voltage command Vwb, as the three-phase voltage commands, there can be utilized all-known technology such as a so-called current feedback control in which current commands Id_ref and Iq_ref on rotating two axes, as the control commands Com from the outside, for the three-phase AC rotating electric machine 1 are set and then based on the differences between the current commands Id_ref and Iq_ref on the rotating two axes and currents Idc and Iqc obtained by coordinate-converting the corrected U-phase current detection value Iuc, the corrected V-phase current detection value Ivc, and the corrected W-phase current detection value Iwc outputted from the foregoing phase current calculation unit 9a into the values on the rotating two axes of the three-phase AC rotating electric machine 1, the U-phase voltage command Vub, the V-phase voltage command Vvb, and the W-phase voltage command Vwb are calculated through proportional integration control for making the differences become zero.

As described above, the U-phase upper arm switching device Sup, the U-phase lower arm switching device Sun, the V-phase upper arm switching device Svp, the V-phase lower arm switching device Svn, the W-phase upper arm switching device Swp, and the W-phase lower arm switching device Swn in the three-phase inverter 3 PWM-controlled based on the driving signals generated by comparing the PWM carrier signal with the corrected U-phase voltage command Vu, the corrected V-phase voltage command Vv, and the corrected W-phase voltage command Vw, as the corrected three-phase voltage commands, that are inputted from the corrected three-phase voltage command calculation unit 8a.

Based on the foregoing PWM control, the three-phase inverter 3 outputs a U-phase voltage, a V-phase voltage, and a W-phase voltage that keep track of the corrected U-phase voltage command Vu, the corrected V-phase voltage command Vv, and the corrected W-phase voltage command Vw, respectively, as the corrected three-phase voltage commands, from the U-phase terminal U, the V-phase terminal V, and the W-phase terminal W, which are the AC terminals, and then drives the three-phase AC rotating electric machine 1.

Figure 4:
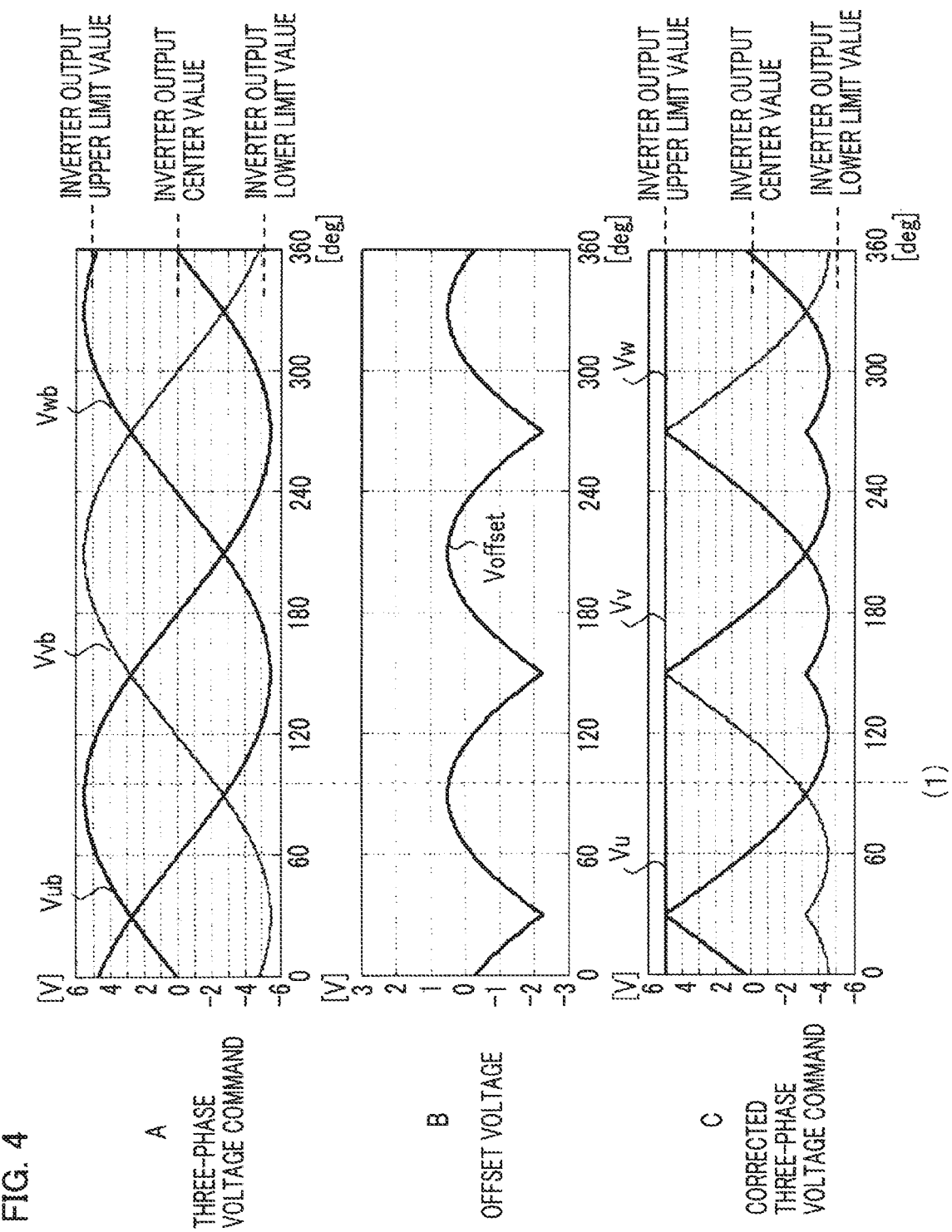
FIG. 4 is a set of explanatory charts representing three-phase voltage commands, an offset voltage, and corrected three-phase voltage command in the electric-power conversion apparatus according to Embodiment 1 of the present invention.

Next, there will be explained the U-phase voltage command Vub, the V-phase voltage command Vvb, and the W-phase voltage command Vwb, as the three-phase voltage commands, the offset voltage Voffset, and the corrected U-phase voltage command Vu, the corrected V-phase voltage command Vv, and the corrected W-phase voltage command Vw, as the corrected three-phase voltage commands, in the electric-power conversion apparatus according to Embodiment 1 of the present invention. FIG. 4 is a set of explanatory charts representing the three-phase voltage commands, the offset voltage, and the corrected three-phase voltage commands in the electric-power conversion apparatus according to Embodiment 1 of the present invention; Chart A represents the U-phase voltage command Vub, the V-phase voltage command Vvb, and the W-phase voltage command Vwb, as the three-phase voltage commands; Chart B represents the offset voltage Voffset; Chart C represents the corrected U-phase voltage command Vu, the corrected V-phase voltage command Vv, and the corrected W-phase voltage command Vw, as the corrected three-phase voltage commands. In each of Charts A, B, and C of FIG. 4, the ordinate denotes the voltage [V] and the abscissa denotes the electric angle [deg].

As described above, because the DC voltage Vdc, which is the output voltage of the DC power source 2, is set to 10 [V], the voltage range in which the corrected U-phase voltage command Vu, the corrected V-phase voltage command Vv, and the corrected W-phase voltage command Vw, as the corrected three-phase voltage commands represented in Chart C of FIG. 4, are outputted without saturation is the section of 10 [V], which is the range from −5 [V] to +5 [V]. The output lower Limit value (the minimum value of the PWM carrier signal) or the inverter 3 is −5 [V]; the output center value (the output center value of the PWM carrier signal) of the inverter 3 is 0 [V]; the output upper limit value (the output maximum value of the PWM carrier signal) of the inverter 3 is +5 [V].

As represented in Chart C of FIG. 4, with respect to the U-phase voltage command Vub, the V-phase voltage command Vvb, and the W-phase voltage command Vwb, as the three-phase voltage commands, the corrected U-phase voltage command Vu, the corrected V-phase voltage command Vv, and the corrected W-phase voltage command Vw, as the corrected three-phase voltage commands, are shifted based on the offset voltage Voffset in such a way that the maximum phases thereof each coincide with the output upper limit value (the output maximum value of the PWM carrier signal) of the inverter 3, i.e., +5 [V].

Figure 5:
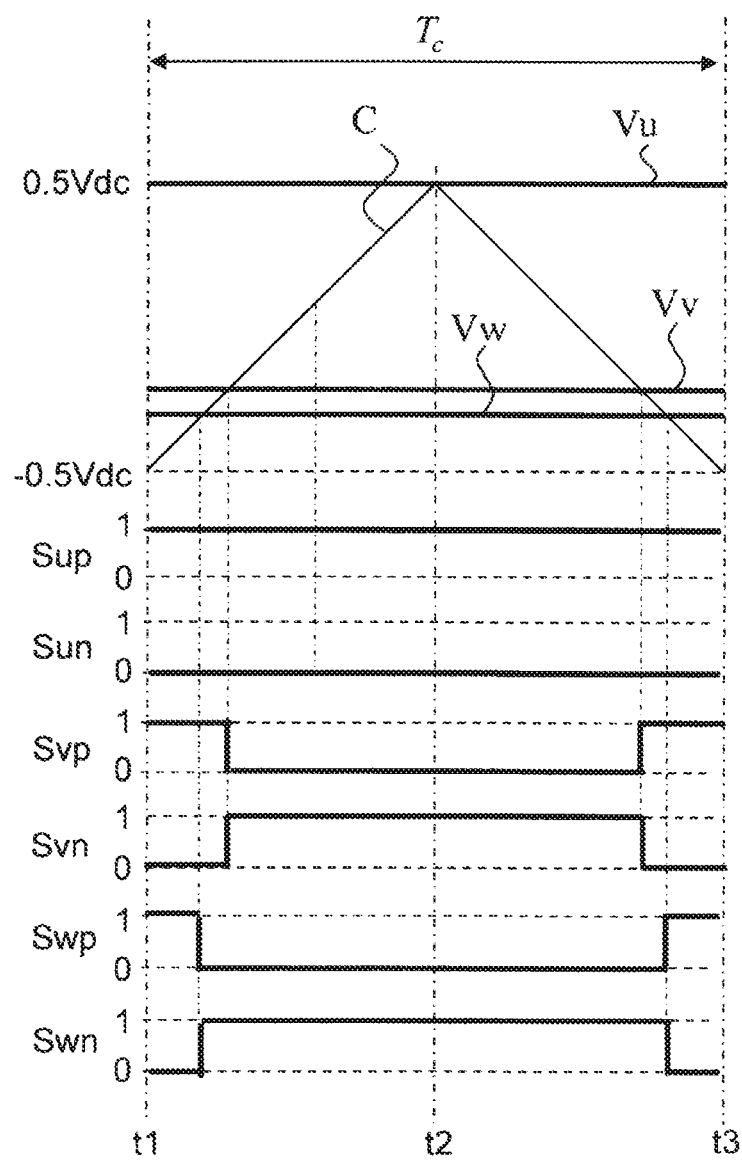
FIG. 5 is an explanatory chart for explaining a PWM carrier signal, the corrected three-phase voltage commands, a situation of operation of switching devices in a three-phase inverter, and a carrier period Tc in the electric-power conversion apparatus according to Embodiment 1 of the present invention.

Taking a time point (1) in FIG. 4 as an example, there will be explained the PWM carrier signal C, the corrected U-phase voltage command Vu, the corrected V-phase voltage command Vv, and the corrected W-phase voltage command Vw, as the corrected three-phase voltage commands, and the carrier period Tc of each of the U-phase upper arm switching device Sup, the U-phase lower arm switching device Sun, the V-phase upper arm switching device Svp, the V-phase lower arm switching device Svn, the W-phase upper arm switching device Swp, and the W-phase lower arm switching device Swn in the three-phase inverter 3. FIG. 5 is an explanatory chart for explaining a PWM carrier signal, the corrected three-phase voltage commands, a situation of operation of switching devices in a three-phase inverter, and a carrier period Tc in the electric-power conversion apparatus according to Embodiment 1 of the present invention In FIG. 5, "1" on the ordinate suggests that each of the U-phase upper arm switching device Sup, the U-phase lower arm switching device Sun, the V-phase upper arm switching device Svp, the V-phase lower arm switching device Svn, the W-phase upper arm switching device Swp, and the W-phase lower arm switching device Swn in the three-phase inverter 3 is turned on; "0" suggests that each thereof is turned off.

In FIG. 5, the carrier signal C and the corrected three-phase voltage command are compared with each other for each of the phases; in the case where the corrected three-phase voltage command is larger than the carrier signal C, the upper-arm switching device of each phase is turned on; in the case where the corrected three-phase voltage command is smaller than the carrier signal C, the lower-arm switching device of each phase is turned on. The U-phase voltage command Vub among the three-phase voltage commands becomes maximum at the time point (1) in FIG. 4, and the corrected U-phase voltage command Vu is shifted to the maximum value of the PWM carrier signal C; thus, As represented in FIG. 5, the U-phase upper arm switching device Sup is always turned on and the U-phase lower arm switching device Sun is always turned off during the carrier period Tc, i.e., during the time from a time point t1 to a time point t3. The PWM carrier signal C has the shape of a triangular waveform that becomes maximum at a time point t2, which is a middle time point in the time from the time point t1 to the time point t3.

FIG. 6 is an explanatory table representing respective voltage vectors for the operation patterns of the switching devices in the three-phase inverter in the electric-power conversion system according to Embodiment 1 of the present invention. As represented in FIG. 6, in each of the voltage vectors V1 through V6, the switching device of one phase or the switching devices of two phases in one or the group of the upper arm switching devices Sup, Svp, and Swp and the group of the lower arm switching devices Sun, Svn, and Swn in the inverter 3 are turned on; the switching device of one phase or the switching devices of two phases in the other one of the group of the upper arm switching devices Sup, Svp, and Swp and the group of the lower arm switching devices Sun, Svn, and Swn are turned on. Each of the voltage vectors V1 through V6 is defined as an effective voltage vector.

Subsequently, there will be explained a detection time point at which the foregoing current detector 4 detects a current detection value. In Embodiment 1 of the present invention, at the time point when the PWM carrier signal C takes its maximum value, the current detector 4 detects the current of each phase in the three-phase inverter 3 and then outputs the current detection values Uu, Iv, and Iw. The time point when the PWM carrier signal C takes its maximum value coincides with the time point t2 in FIG. 5. As represented in FIG. 5, at the time point t2, the U-phase upper arm switching device Sup is turned on and the U-phase lower arm switching device Sun is turned off; therefore, because the U-phase current detection resistor Ru connected in series with the U-phase lower arm switching device Sun is energized with no current, the U-phase current detection value Iu takes a value corresponding to the current of 0 [A] (strictly speaking, the U-phase current detection value Iu consists of only observation noise).

As represented in FIG. 5, at the time point t2, the V-phase upper arm switching device Svp is turned off and the V-phase lower arm switching device Svn is turned on; thus, the V-phase current detection value Iv becomes a value corresponding to the V-phase current Iv_real of the three-phase inverter 3. Moreover, at the time point t2, the W-phase upper arm switching device Swp is turned off and the W-phase lower arm switching device Swn is turned on; thus, the W-phase current detection value Iw becomes a value corresponding to the W-phase current Iw_real of the three-phase inverter 3.

As represented in FIGS. 5 and 6, at the time point t2, the voltage vector is an effective voltage vector V1. In this situation, the timing of detecting the current detection value for obtaining the effect of the electric-power conversion apparatus according to Embodiment 1 of the present invention is not limited to the time point t2 when the PWM carrier signal C takes its maximum value but may be a time point when the voltage vector is the effective voltage vector V1. This is because in the section where as the voltage vector, the effective voltage vector V1 is outputted, the respective operational states of the switching devices Sup through Swn of the inverter 3 do not differ from the operational states thereof at the time point t2.

Similarly, the timing of detecting the current, detection value for obtaining the effect of the electric-power conversion apparatus according to Embodiment 1 of the present invention may be a time point at which the voltage vector is an effective voltage vector V3, when the V-phase voltage command Vvb among the U-phase voltage command Vub, the V-phase voltage command Vvb, and the W-phase voltage command Vwb, as the three-phase voltage commands, is of the maximum phase; the timing of detecting the current detection value for obtaining the effect of the electric-power conversion apparatus according to Embodiment 1 of the present invention may be a time point when the voltage vector is an effective voltage vector V5, when the W-phase voltage command Wvb among the U-phase voltage command Vub, the V-phase voltage command Vvb, and the W-phase voltage command Vwb, as the three-phase voltage commands, is of the maximum phase.

Figure 7:
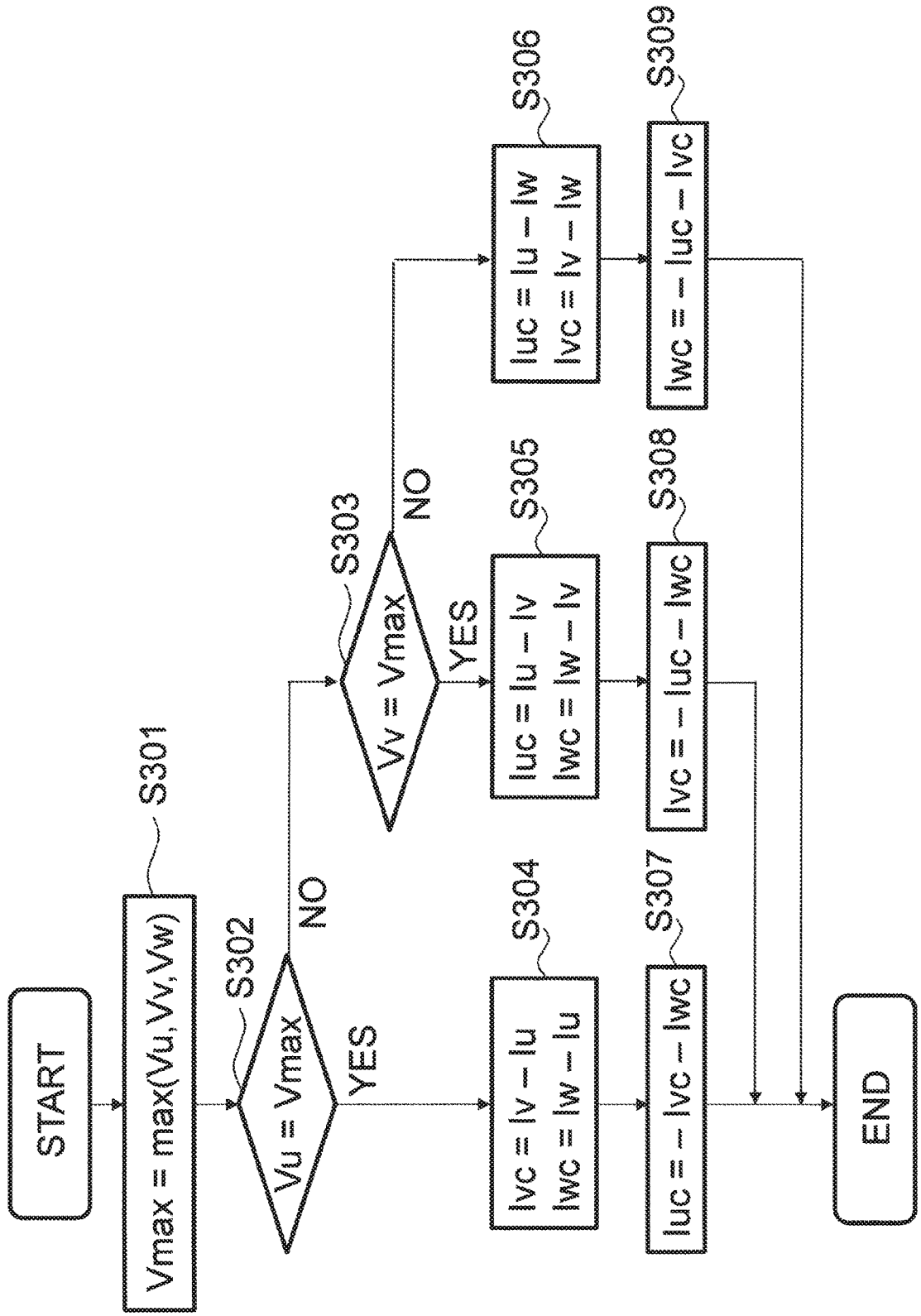
FIG. 7 is a flowchart representing the calculation procedure of a phase current calculation unit in the electric-power conversion apparatus according to Embodiment 1 of the present invention.

Next, the procedure of the calculation by the foregoing phase current calculation unit 9a will be explained. FIG. 7 is a flowchart representing the calculation procedure of the phase current calculation unit in the electric-power conversion apparatus according to Embodiment 1 of the present invention. In FIG. 7, at first, in the step S301, the corrected voltage command of the phase having the largest value among the corrected U-phase voltage command Vu, the corrected V-phase voltage command Vv, and the corrected W-phase voltage command Vw, as the corrected three-phase voltage commands, is referred to as a maximum corrected voltage command Vmax. Subsequently, in the step S302, it is determined whether or not the corrected U-phase voltage command Vu coincides with the maximum corrected voltage command Vmax; in the case where the corrected U-phase voltage command Vu coincides with the maximum corrected voltage command Vmax (YES), the step S304 is implemented; in the case where the corrected U-phase voltage command Vu does not coincide with the maximum corrected voltage command Vmax (No), the step S303 is implemented.

In the step S303, it is determined whether or not the corrected V-phase voltage command Vv coincides with the maximum corrected voltage command Vmax; in the case where the corrected V-phase voltage command Vv coincides with the maximum corrected voltage command Vmax (YES), the step S305 is implemented; in the case where the corrected V-phase voltage command Vv does not coincide with the maximum corrected voltage command Vmax (NO), the step S306 is implemented.

In the step S304 following the step S302, the corrected V-phase current detection value Ivc is calculated by subtracting the U-phase current detection value Iu from the V-phase current detection value Iv, and the corrected W-phase current detection value Iwc is calculated by subtracting the U-phase current detection value Iu from the W-phase current detection value Iw.

In the processing of the step S305 following the step S303, the corrected U-phase current detection value Iuc is calculated by subtracting the V-phase current detection value Iv from the U-phase current detection value Iu, and the corrected W-phase current detection value Iwc is calculated by subtracting the V-phase current detection value Iv from the W-phase current detection value Iw.

In contrast, in the processing of the step S306 following the step S303, the corrected U-phase current detection value Iuc is calculated by subtracting the W-phase current detection value Iw from the U-phase current detection value Iu, and the corrected V-phase current detection value Ivc is calculated by subtracting the W-phase current detection value Iw from the V-phase current detection value Iv. In this situation, through the processing in the corrected three-phase voltage command calculation unit 8a, the maximum-phase corrected three-phase voltage command among the corrected three-phase voltage commands is made to coincide with the maximum value of the PWM carrier signal C; thus, as represented in FIG. 5 where as described above, the corrected U-phase voltage command is of the maximum phase, the corrected U-phase voltage command Vu, which is the maximum-phase corrected voltage command, turns on the U-phase upper arm switching device Sup at the time point t2 at which the current detection value is obtained. In contrast, the corrected V-phase voltage command Vv turns on the V-phase lower arm switching device Svn, and the corrected W-phase voltage command Vw turns on the W-phase lower arm switching device Swn.

Accordingly, each of the calculation in the step S304 there the maximum phase of the corrected three-phase voltage commands is the U phase, the calculation in the step S305 where the maximum phase of the corrected three-phase voltage commands is the V phase, and the calculation in the step S306 where the maximum phase of the corrected three-phase voltage commands is the W phase is equivalent to the calculation where the corrected current detection value of the phase where the lower-arm switching device is turned on is calculated by subtracting the current-detection value of the phase where the upper-arm switching device is turned on from the current-detection value of the phase where the lower-arm switching device is turned on.

Next, in the step S307 following the step S304, the respective sign inverted values of the corrected V-phase current detection value Ivc and the corrected W-phase current detection value Iwc are added so that the corrected U-phase current detection value Iuc is obtained. In the step S308 following the step S305, the respective sign inverted values of the corrected U-phase current detection value Iuc and the corrected W-phase current detection value Iwc are added so that the corrected V-phase current detection value Ivc is obtained. Furthermore, in the step S309 following the step S306, the respective sign inverted values of the corrected U-phase current detection value Iuc and the corrected V-phase current detection value ivc are added so that the corrected W-phase current detection value Iwo is obtained.

Next, the effect of the electric-power conversion apparatus according to Embodiment 1 of the present invention will be described in contrast to the conventional electric-power conversion apparatus disclosed in foregoing Patent Document 1. In the current detector 4 that detects the U-phase current Iu_real, the V-phase current Iv_real, and the W-phase current Iw_real flowing in the three-phase inverter 3, it is generally implemented that the respective voltages (substantially several millivolts through several hundreds of millivolts) across the current detection resistors Ru, Rv, and Rw of the respective phases are each amplified up to the voltage value (substantially 0 [V] through 5 [V]) suitable for being inputted to a microprocessor or a DSP, by use of the first amplifier 81, the second amplifier 82, and the third amplifier 83 represented in FIG. 1. In many cases, the respective grounds (reference electric potentials) of the first amplifier 81, the second amplifier 82, and the third amplifier 83 provided corresponding to the respective phases are set to a common electric potential. Accordingly, as described above, the respective observation noise signals included in the current detection values of the respective phases include many in-phase components that coincide among all the phases.

It is assumed that the current detection values Iu, Iv, and Iw of the respective phases including the in-phase observation noise signals are given by the following equations (1), (2), and (3), respectively.

$$i_u = -\frac{\sqrt{2}}{\sqrt{3}}(I_{amp}\sin(\theta) + I_{noise}) \tag{1}$$

$$i_v = -\frac{\sqrt{2}}{\sqrt{3}}\left(I_{amp}\sin\left(\theta - \frac{2\pi}{3}\right) + I_{noise}\right) \tag{2}$$

$$i_w = -\frac{\sqrt{2}}{\sqrt{3}}\left(I_{amp}\sin\left(\theta + \frac{2\pi}{3}\right) + I_{noise}\right) \tag{3}$$

In the above equations, θ, Iamp, and Inoise denote the motor rotation angle, the current amplitude, and the observation noise, respectively. The frequency of the observation noise Inoise is substantially several tens of herz through several kilohertz.

Next, the equation (4) below is a definition equation for a q-axis current iqc on the rotating two axes.

$$i_{qc} = -\frac{\sqrt{2}}{\sqrt{3}}\left(i_u\sin\theta + i_v\sin\left(\theta - \frac{2\pi}{3}\right) + i_w\sin\left(\theta + \frac{2\pi}{3}\right)\right) \tag{4}$$

When in the case where all the current detection values Iu, Iv, and Iw given by the foregoing equations (1) through (3) can be detected, the current detection values Iu, Iv, and Iw are substituted into the equation (4), the equation (5) below is obtained.

Accordingly, in the case where all the current detection values $$i_{qc} = I_{amp} \tag{5}$$

Accordingly, in the case where all the current detection values of the three phases can be detected, no effect of the observation noise Inoise appears in the currents on the rotating two axes.

Meanwhile, there will be considered a case where the on time (the time in which the maximum-phase current detection resistor is energized) of the maximum-phase lower-arm switching device is shorter than a time sufficient for accurately detecting a current without undergoing the effect of ringing. In that case, in the electric-power conversion apparatus disclosed in Patent Document 1, when the maximum phase is, for example, the U phase, the V-phase current and the W-phase current are detected; thus, in that case, the three phase current detection values are determined according to the following equations (6), (7), and (8).

$$i_v = -\frac{\sqrt{2}}{\sqrt{3}}\left(I_{amp}\sin\left(\theta - \frac{2\pi}{3}\right) + I_{noise}\right) \tag{6}$$

$$i_w = -\frac{\sqrt{2}}{\sqrt{3}}\left(I_{amp}\sin\left(\theta + \frac{2\pi}{3}\right) + I_{noise}\right) \quad (7)$$

$$i_u = -i_v - i_w \quad (8)$$

That is to say, the U-phase current iu given by the equation (8) is calculated from the addition of the sign inverted value (−iv) of the V-phase current detection value and the sign inverted value (−iw) of the W-phase current detection value, by utilizing the fact that the summation of the three-phase currents is zero.

Then, when the equations (6), (7), and (8) are substituted into the equation (4), the equation (9) below is given.

$$i_{qc} = I_{amp} - 2I_{noise}\sin\theta \quad (9)$$

Accordingly, in the case where the conventional current detection method disclosed in Patent Document 1, in which two phases other than the maximum phase is selected from the three-phase current detection values, is utilized, the effect of the noise component Inoise appears also in the currents on the rotating two axes and hence the basic command calculation unit 6 calculates the three-phase voltage commands in such a way that the difference between each of the currents, including the noise component Incise, on the rotating two axes and the current command value becomes zero; therefore, the effect of the noise component Inoise is provided to the three-phase voltage commands and hence causes a torque ripple, a vibration, and a noise sound in the three-phase AC rotating electric machine 1 to increase.

Next, in the electric-power conversion apparatus according to Embodiment 1 of the present invention, when as is the case described above, the maximum phase is the U phase, the maximum-phase corrected voltage command among the corrected three-phase voltage commands is made to coincide with the maximum value of the carrier signal C, through the processing by the corrected three-phase voltage command calculation unit 8a; thus, because as represented in FIG. 5, the U-phase upper-arm switching device Sup is turned on at the time point t2, which is a detection time point at which the current detection value is detected, the lower-arm switching device Sun is energized with no current and hence the current detection value consists only of observation noise.

In contrast, with regard to the V phase and the W phase, because the lower-arm switching devices Svn and Swn are turned on, the V-phase current detection resistor Rv and the W-phase current detection resistor Rw are each energized with electric current; thus, as the respective current detection values, there are detected values obtained by adding the observation noise to the respective values corresponding to the currents applied to the V phase and the W phase of the three-phase inverter 3.

As a result, the respective current detection values are given by the equations (10), (11), and (12) below.

$$i_u = -\frac{\sqrt{2}}{\sqrt{3}}(I_{noise}) \quad (10)$$

$$i_v = -\frac{\sqrt{2}}{\sqrt{3}}\left(I_{amp}\sin\left(\theta - \frac{2\pi}{3}\right) + I_{noise}\right) \quad (11)$$

$$i_w = -\frac{\sqrt{2}}{\sqrt{3}}\left(I_{amp}\sin\left(\theta + \frac{2\pi}{3}\right) + I_{noise}\right) \quad (12)$$

Next, in the electric-power conversion apparatus according to Embodiment 1 of the present invention, as represented in the step S304 (or in the step S305 or the step S306) in FIG. 7, the current detection value of the phase where the lower-arm switching device is turned on is corrected with the current detection value of the maximum phase (or the phase where the upper-arm switching device is turned on). Therefore, when the foregoing equation (10) that represents the current detection value of the U phase, which is the maximum phase, is subtracted from each of the foregoing equations (11) and (12) that represent the respective current detection values of the V phase and the W phase, the equations (13) an (14) below are obtained.

$$i_{vc} = i_v - i_u = -\frac{\sqrt{2}}{\sqrt{3}}I_{amp}\sin\left(\theta - \frac{2\pi}{3}\right) \quad (13)$$

$$i_{wc} = i_w - i_u = -\frac{\sqrt{2}}{\sqrt{3}}I_{amp}\sin\left(\theta + \frac{2\pi}{3}\right) \quad (14)$$

In the step S307 in FIG. 7, the corrected U-phase current detection value Iuc is given by the equation (15) below.

$$i_{uc} = -i_{vc} - i_{wc} = -\frac{\sqrt{2}}{\sqrt{3}}I_{amp}\sin(\theta) \quad (15)$$

Next, when in the foregoing equation (4) representing the definition of the q-axis current, iu, iv, and iw are replaced by iuc, ivc, and iwc, respectively, and then the foregoing equations (13), (14) and (15) are substituted into the equation (4), the equation (16) below is obtained.

$$i_{qc} = I_{amp} \quad (16)$$

Due to the temperature change or the change with time, the characteristics of the first amplifier 81, the second amplifier 82, the third amplifier 83, and the current detection resistors Ru, Rv, and Rw included in the current detector 4 change. Because the members having substantially the same characteristics are utilized, it can be regarded that the offset errors caused by the change in the characteristic are substantially the same. That is to say, the offset errors may be regarded as noise components that are superimposed in an in-phase manner; thus, the noise component Inoise can obtain the same effect also on the DC component. Accordingly, because as is clear from the equation (16), no item including the noise component Inoise does not appear, the electric-power conversion apparatus according to Embodiment 1 of the present invention does not undergo the effect of the noise component Inoise.

As described above, in the electric power conversion apparatus according to Embodiment 1 of the present invention, the respective phases are equally shifted in such a way that the maximum-phase voltage command among the three-phase voltage commands coincides with the maximum value of the PWM carrier signal; the current detection values are detected at a timing when the PWM carrier signal takes the maximum value; then, the detection value of the phase where the lower-arm switching device of the three-phase inverter is turned on is corrected with the current detection value of the phase where at the detection timing, the upper-arm switching device is turned on. As a result, there can be demonstrated a prominent effect, which is unprecedented in a conventional apparatus, that the effect of the observation noise signals that are included in the current detection values and are in-phase among the three phases can be reduced.

Similarly, with regard to a three-phase AC rotating electric machine having two groups of three-phase windings, even in the case of an electric-power conversion apparatus in which one three-phase inverter and one current detector are provided for one group of three-phase windings so that totally two current detectors are provided for two groups of three-phase windings, the electric-power conversion apparatus according to Embodiment 1 of the present invention can be utilized when a common reference (ground) electric potential is set for the two current detectors.

For example, with the current detection value, of the phase where the upper-arm switching device is turned on, that is detected by one current detector (referred to as a current detector A, hereinafter), the current detection value, of the phase where the lower-arm switching device is turned on, that is detected by the other current detector (referred to as a current detector B, hereinafter) is corrected, so that there can be reduced the effect, of the observation noise, that is provided to the current detection value in the current detector B. Similarly, with the current detection value, of the phase where the upper-arm switching device is turned on, that is detected by the current detector B, the current detection value, of the phase where the lower-arm switching device is turned on, that is detected by the current detector A is corrected, so that there can be reduced the observation noise in the current detection value in the current detector A.

In the case where in the current detector the respective current detection resistors Ru, Rv, and Rw are provided in series with the U-phase upper arm switching device Sup, the V-phase upper arm switching device Svp, and the W-phase upper arm switching device Swp of the three-phase inverter 3, the offset voltage calculation unit 7a calculates the offset voltage Voffset for making the minimum phase among the three-phase voltage commands shift to coincide with the minimum value of the PWM carrier signal C; the corrected three-phase voltage command calculation unit 8a makes the minimum phase of the corrected three-phase voltage commands shift to coincide with the minimum value of the PWM carrier signal C; the current detection values are detected at a time point when the PWM carrier signal takes the minimum value; then, the current detection value of the phase where the upper-arm switching device is turned on is corrected with the current detection value corresponding to the minimum phase where the lower-arm switching device is turned on. Thus, it goes without saying that the same effect is obtained.

Embodiment 2

Next, an electric-power conversion apparatus according to Embodiment 2 of the present invention will be explained. The overall configuration diagram of the electric-power conversion apparatus according to Embodiment 2 of the present invention is the same as FIG. 1, described above. The electric-power conversion apparatus according to Embodiment 2 differs from the electric-power conversion apparatus according to Embodiment 1 in the configuration of the offset voltage calculation unit and the detection time point for the current detection value. In the following explanation, the difference from Embodiment 1 will mainly be explained.

Figure 8:
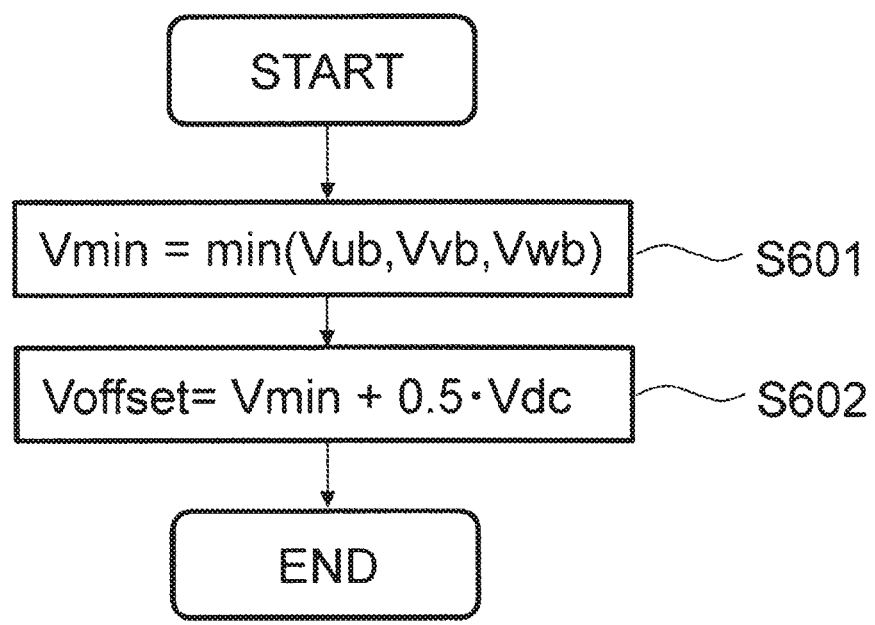
FIG. 8 is a flowchart representing the calculation procedure of an offset voltage calculation unit in an electric-power conversion apparatus according to Embodiment 2 of the present invention.

FIG. 8 is a flowchart representing the calculation procedure of the offset voltage calculation unit in the electric-power conversion apparatus according to Embodiment 2 of the present invention. Based on the U-phase voltage command Vub, the V-phase voltage command Vvb, and the W-phase voltage command Vwb, as the three-phase voltage commands, the offset voltage calculation unit 7a represented in FIG. 1 calculates an offset voltage Voffset. In FIG. 8, at first, in the step S601, there is calculated a minimum voltage command Vmin, which is a minimum-phase voltage command at a time when the respective phases of the U-phase voltage command Vub, the V-phase voltage command Vvb, and the W-phase voltage command Vwb are classified into the maximum phase, the middle phase, and the minimum phase, based on the magnitude of the foregoing voltage commands Vub, Vvb, and Vwb. Subsequently, in the step S602, a voltage obtained by multiplying the DC voltage Vdc by a constant [0.5] is added to the minimum voltage command Vmin obtained in the step S601, so that the offset voltage Voffset is calculated.

Figure 9:
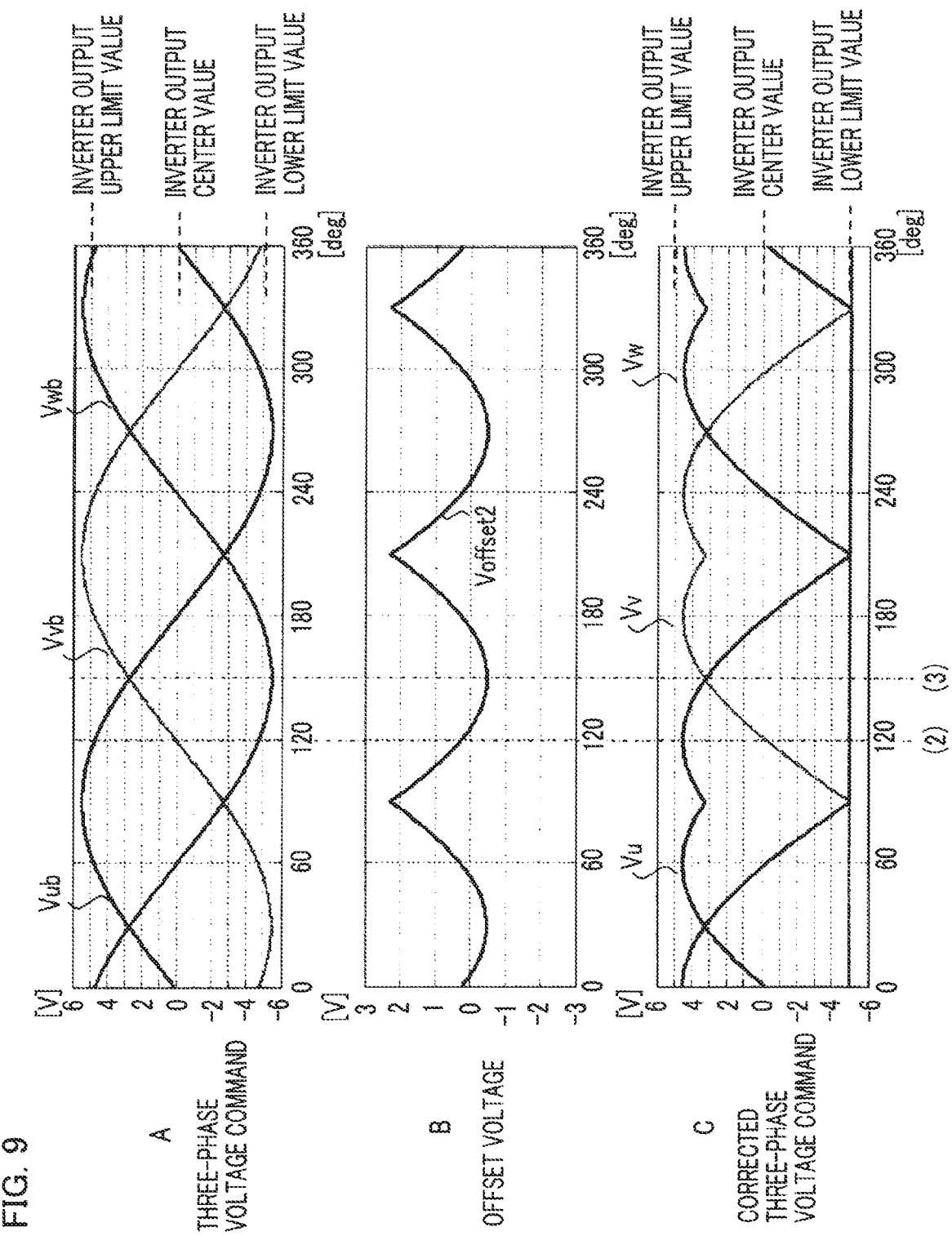
FIG. 9 is a set of explanatory charts representing three-phase voltage commands, an offset voltage, and corrected three-phase voltage commands in the electric-power conversion apparatus according to Embodiment 2 of the present invention.

FIG. 9 is a set of explanatory charts representing the three-phase voltage commands, the offset voltage, and the corrected three-phase voltage commands in the electric-power conversion apparatus according to Embodiment 2 of the present invention; Chart A represents the U-phase voltage command Vub, the V-phase voltage command Vvb, and the W-phase voltage command Vwb, as the three-phase voltage commands; Chart B represents the offset voltage Voffset; Chart C represents the corrected U-phase voltage Command Vu, the corrected V-phase voltage command Vv, and the corrected W-phase voltage command Vw, as the corrected three-phase voltage commands. In each of Charts A, B, and C in FIG. 4, the ordinate denotes the voltage [V] and the abscissa denotes the electric angle [deg].

As is clear from respective waveforms of the corrected U-phase voltage command Vu, the corrected V-phase voltage command Vv, and the corrected W-phase voltage command Vw, as the corrected three-phase voltage commands, represented in the chart C of FIG. 9, with respect to the phase voltage command Vub, the V-phase voltage command Vvb, and the W-phase voltage command Vwb, as the three-phase voltage commands, the respective phases of the corrected U-phase voltage command Vu, the corrected V-phase voltage command Vv, and the corrected W-phase voltage command Vw, as the corrected three-phase voltage commands, are equally shifted in such a way that the minimum phases thereof each coincide with the inverter output lower limit value (the outp minimum value of the PWM carrier signal C).

Taking time points (1) and (2) in FIG. 9 as examples, there will be explained the PWM carrier signal C, the corrected U-phase voltage command Vu, the corrected V-phase voltage command Vv, and the corrected W-phase voltage command Vw as the corrected three-phase voltage commands, and the carrier period Tc of each of the U-phase upper arm switching device Sup, the U-phase lower arm switching device Sun, the V-phase upper arm switching device Svp, the V-phase lower arm switching device Svn, the W-phase upper arm switching device Swp, and the W-phase lower arm switching device Swn in the three-phase inverter 3.

Figure 10:
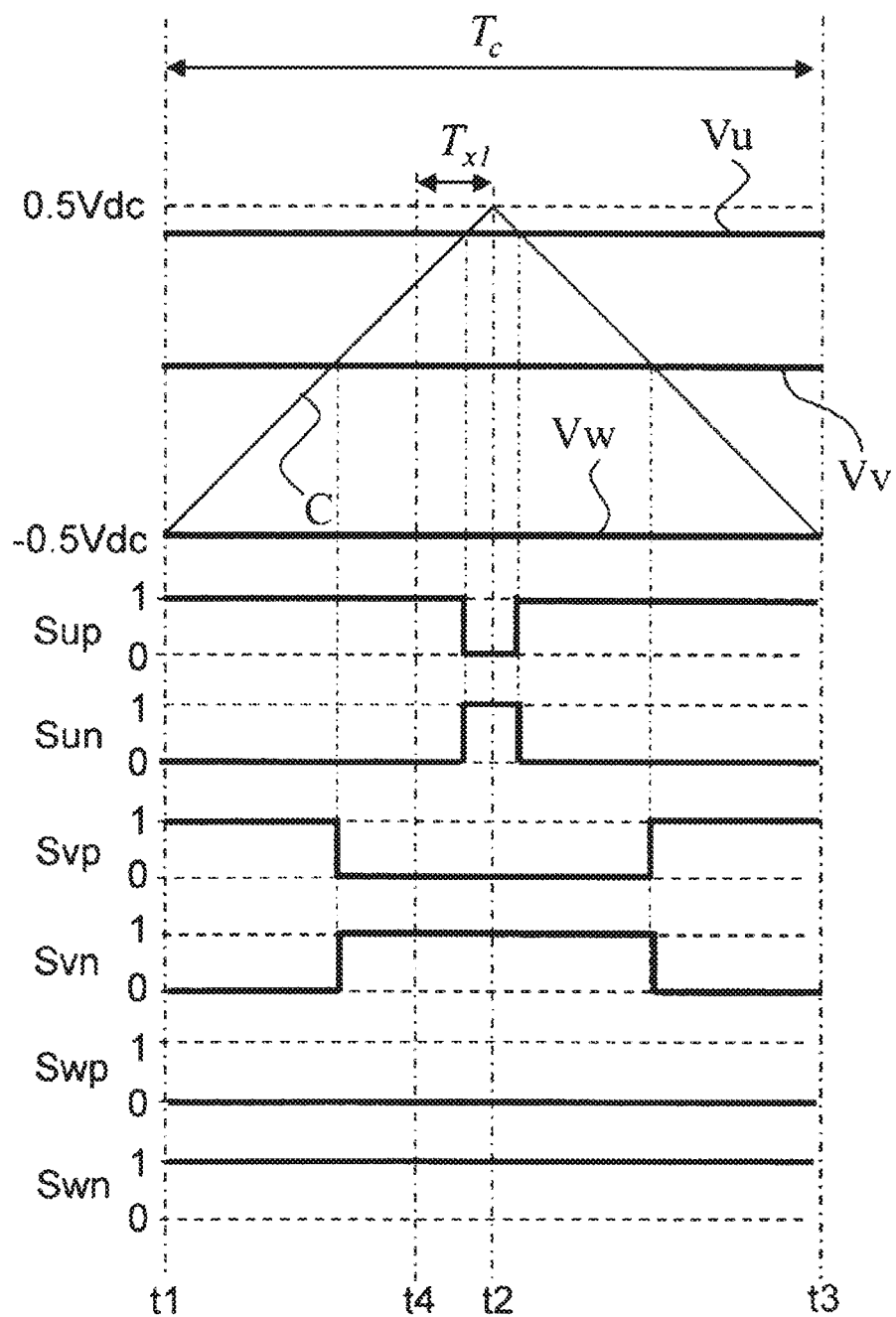
FIG. 10 is an explanatory chart for explaining a PWM carrier signal, the corrected three-phase voltage command, the operational actions of respective switching devices in a three-phase inverter, a U-phase lower arm switching device, and a V-phase upper arm switching device, and a carrier period Tc in the electric-power conversion apparatus according to Embodiment 2 of the present invention.

FIG. 10 is an explanatory chart for explaining the PWM carrier signal, the corrected three-phase voltage commands, the respective switching devices in the three-phase inverter, and the carrier period Tc for each of the U-phase lower arm switching device and the V-phase upper arm switching device in the electric-power conversion apparatus according to Embodiment 2 of the present invention. In the electric-power conversion apparatus according to foregoing Embodiment 1, the current is detected at the time point t2 when the PWM carrier signal C takes its maximum value;

however, as represented in FIG. 10, in the electric-power conversion apparatus according to Embodiment 2, because at a time point immediately prior to the time point t2, the U-phase upper arm switching device Sup is turned from on to off and the U-phase lower arm switching device Sun is turned from off to on, the current detection value includes a ringing at the time point t2; thus, the current outputted from the three-phase inverter 3 cannot accurately be detected.

Thus, in the electric-power conversion apparatus according to Embodiment 2, the current is detected at a time point t4 that is time Tx1 prior to the time point t2. With respect to the time point t2, the time Tx1 is set in such a way as to be a time point immediately prior to the timing when the maximum-phase (the U phase, in the case of FIG. 10) upper-arm switching device and the lower-arm switching device are switched. The switching devices that are turned on (become "1") at the time point t4 in FIG. 10 are the U-phase upper arm switching device Sup, the V-phase lower arm switching device Svn, and the W-phase lower arm switching device Swn.

Accordingly, at the time point t4, the upper-arm switching device is turned on in the maximum phase and the lower-arm switching device is turned on in each of the middle phase and the minimum phase, so that the foregoing effective voltage vector is formed. In the electric-power conversion apparatus according to Embodiment 2, the processing by the phase current calculation unit 9a, described in the electric-power conversion apparatus according to Embodiment 1, is applied to the current detection values detected at the time point t4; thus, the current detection values corresponding to the middle phase and the minimum phase are corrected with the current detection value corresponding to the maximum phase, and the effects of observation noise included in the current detection values correcting to the middle phase and the minimum phase can be reduced.

In the case where in the current detector 4, the respective current detection resistors Ru, Rv, and Rw are provided in series with the U-phase upper arm switching device Sup, the V-phase upper arm switching device Svp, and the W-phase upper arm switching device Swp of the three-phase inverter 3, the offset voltage calculation unit 7b calculates the offset voltage Voffset for making the maximum phase shift to coincide with the maximum value of the PWM carrier; the current detection values are obtained at the timing when the lower-arm switching device is tuned on in the minimum phase and the upper-arm switching device is turned on in each of the maximum phase and the middle phase; then, the phase current calculation unit 9a performs correction the same as that described above. Thus, it goes without saying that an effect the same as that described above is obtained.

Embodiment 3

Figure 11:
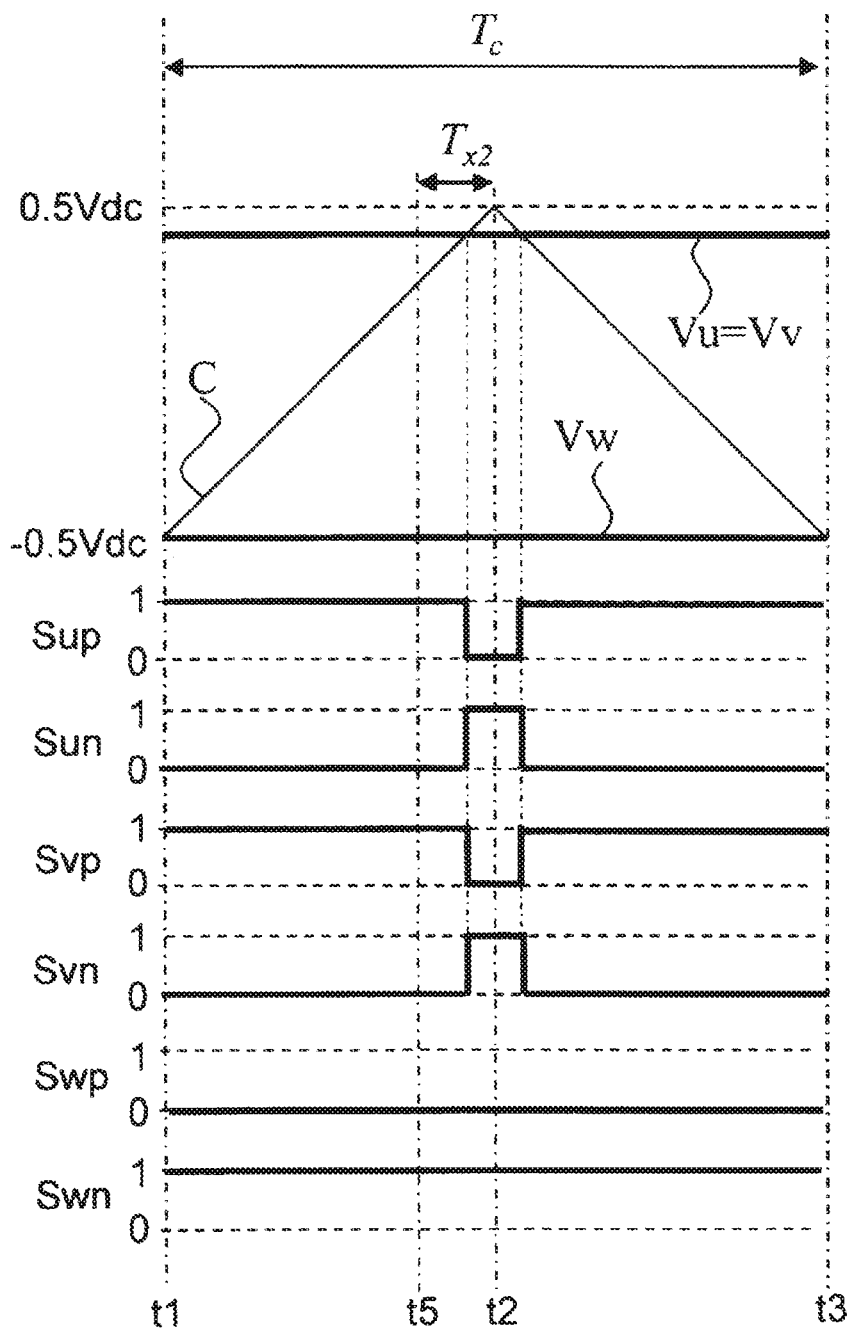
FIG. 11 is an explanatory chart for explaining a PWM carrier signal, corrected three-phase voltage commands, respective switching devices in a three-phase inverter, and a carrier period Tc for each of a U-phase lower arm switching device and a V-phase upper arm switching device in an electric-power conversion apparatus according to Embodiment 3 of the present invention.

Next, an electric-power conversion apparatus according to Embodiment 3 of the present invention will be explained. The overall configuration diagram of the electric-power conversion apparatus according to Embodiment 3 of the present invention is the same as FIG. 1, described above. The electric-power conversion apparatus according to Embodiment 3 differs from the electric-power conversion apparatus according to Embodiment 2 in the configuration of the phase current calculation unit 9b and the detection time point for the current detection value. In the following explanation, the difference from Embodiment 2 will mainly be explained. FIG. 11 is an explanatory chart for explaining the PWM carrier signal, the corrected three-phase voltage commands, the respective switching devices in the three-phase inverter, and the carrier period Tc for each of the U-phase lower arm switching device and the V-phase upper arm switching device in the electric-power conversion apparatus according to Embodiment 3 of the present invention.

Corresponding to the time point (3) in FIG. 9 of foregoing Embodiment 2, FIG. 11 represents the waveforms of the PWM carrier signal C, the corrected U-phase voltage command Vu, the corrected V-phase voltage command Vv, and the corrected W-phase voltage command Vw, as the corrected three-phase voltage commands, and the operational waveforms of the U-phase upper arm switching device Sup, the U-phase lower arm switching device Sun, the V-phase upper arm switching device Svp, the V-phase lower arm switching device Svn, the U-phase upper arm switching device Swp, and the W-phase lower arm switching device Swn in the carrier period Tc.

In FIG. 11, in the electric-power conversion apparatus according to Embodiment 3, the current detecting on value is detected at a time point t5 that is time Tx2 prior to the time point t2. As represented in FIG. 11, the switching devices that are turned on (become "1") at the time point t5 when the current detection values are detected are the U-phase upper arm switching device Sup, the V-phase upper arm switching device Svp, and the W-phase lower arm switching device Swn. Accordingly, at the time point t5, the upper-arm switching device is turned on in each of the U phase, which is the maximum phase, and the V phase, which is the middle phase, and the lower-arm switching device is turned on in the W phase, which is the minimum phase, so that the foregoing effective voltage vector is formed.

Figure 12:
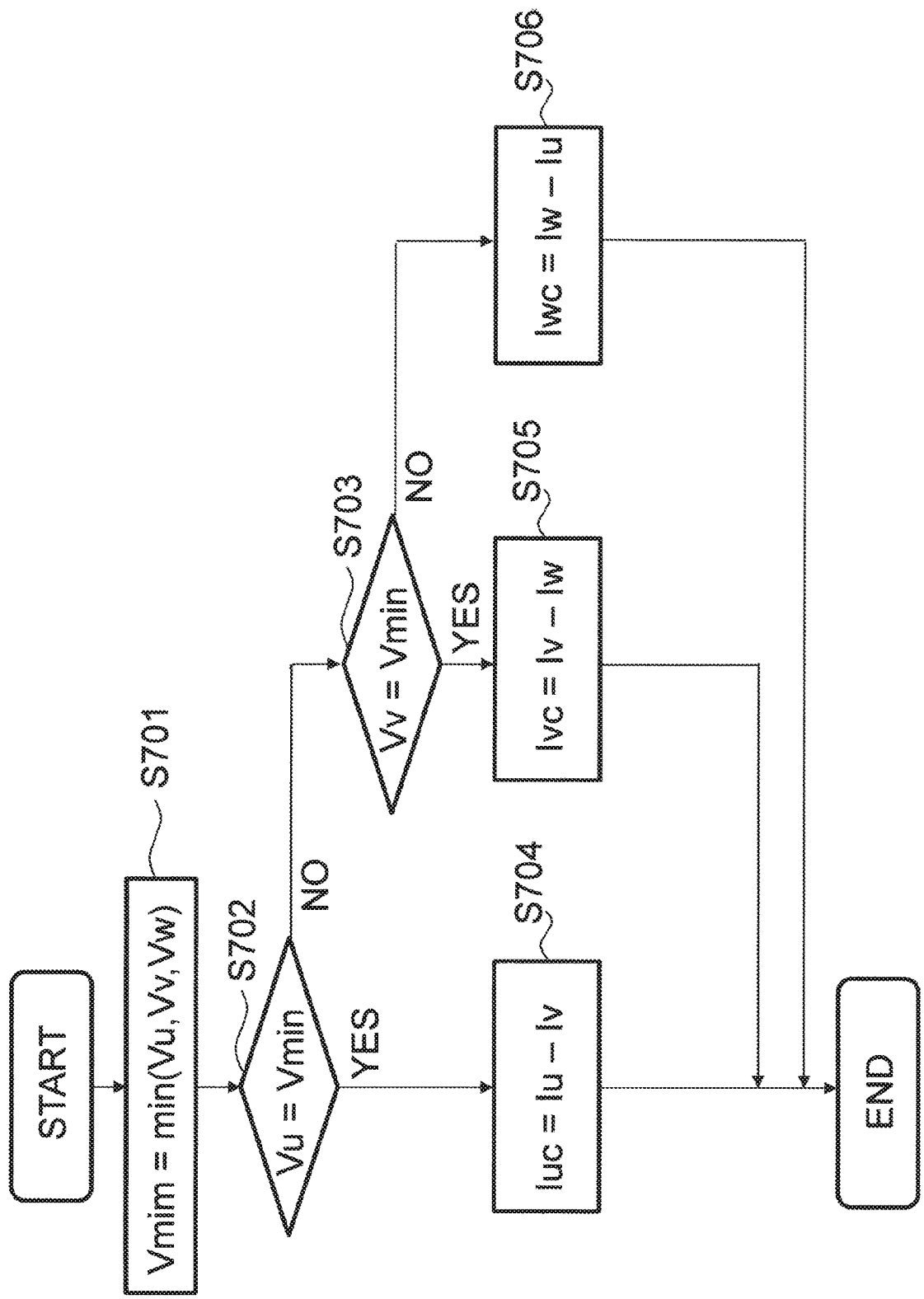
FIG. 12 is a flowchart representing the calculation procedure of a phase current calculation unit in the electric-power conversion apparatus according to Embodiment 3 of the present invention.

Next, the calculation procedure of the phase current calculation unit 9b in the electric-power conversion apparatus according to Embodiment 3 of the present invention will be explained. FIG. 12 is a flowchart representing the calculation procedure of the phase current calculation unit in the electric-power conversion apparatus according to Embodiment 3 of the present invention. In FIG. 12, in the step S701, the corrected voltage command having the smallest value among the corrected U-phase voltage command Vu, the corrected V-phase voltage comment Vv, and the corrected W-phase voltage command Vw, as the corrected three-phase voltage commands, is referred to as a corrected minimum voltage command Vmin. Subsequently, in the step S702, it is determined whether or not the corrected U-phase voltage command Vu coincides with Vmin; in the case where the corrected U-phase voltage command Vu coincides with Vmin (YES), the step S704 is implemented; in the case where the corrected U-phase voltage command Vu does not coincide with Vmin (NO), the step S703 is implemented.

In the step S703 following the step S702, it is determined whether or not the corrected V-phase voltage command Vv coincides with the corrected minimum voltage command Vmin; in the case where the corrected V-phase voltage command Vv coincides with Vmin (YES), the step S705 is implemented; in the case where the corrected V-phase voltage command Vv does not coincide with Vmin (NO), the step S706 is implemented.

In the step S704 following the step S702, the corrected U-phase current detection value Iuc is calculated by subtracting the V-phase current detection value Iv from the U-phase current detection value Iu, which is the current detection value of the minimum-phase U phase.

In the processing in the step S705 following the step S703, the W-phase current detection value Iw is subtracted from the V-phase current detection value Iv, which is the current detection value of the minimum-phase V phase. In the processing in the step S706 following the step S703, the U-phase current detection value Iu is subtracted from the W-phase current detection value Iw, which is the current detection value of the minimum-phase W phase.

As described above, the phase current calculation unit 9b performs correction in which the current detection value of any one of the maximum phase and the middle phase is subtracted from the current detection value of the minimum phase, so that there can be demonstrated a prominent effect, unprecedented in conventional apparatuses, that it is made possible to obtain the current detection value of the minimum phase where the effect of observation noise is reduced.

In the case where in the current detector 4, the respective current detection resistors Ru, Rv, and Rw are provided in series with the U-phase upper arm switching device Sup, the V-phase upper arm switching device Svp, and the W-phase upper arm switching device Swp of the three-phase inverter 3, it goes without saying that the phase current calculation unit 9b performs correction calculation in which the current detection value of any one of the other two phases (the middle phase or the minimum phase) is subtracted from the current detection value of the maximum phase so that there is obtained the current detection value of the maximum phase where the effect of observation noise is reduced.

Embodiment 4

Figure 13:
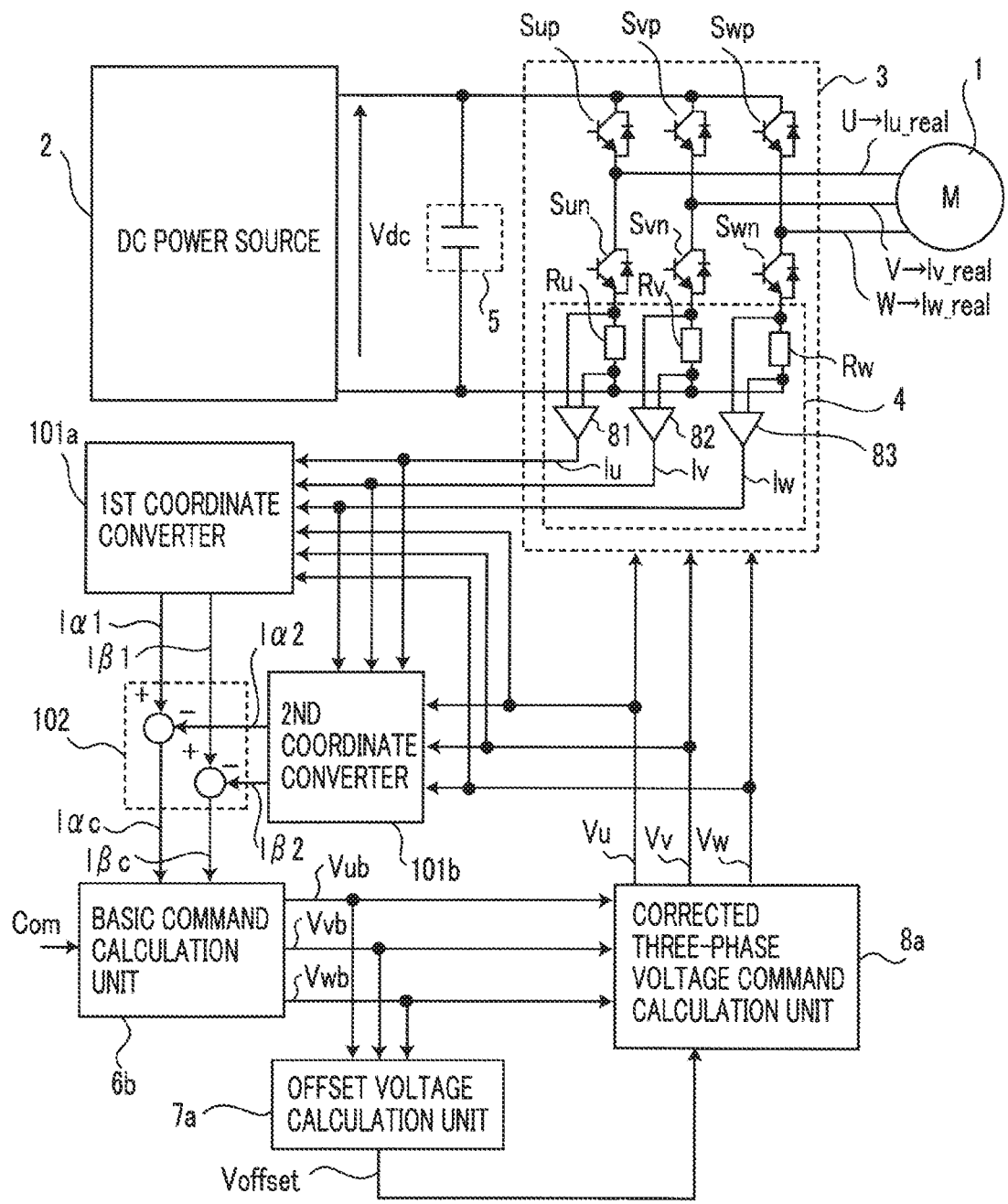
FIG. 13 is an overall configuration diagram of an electric-power conversion apparatus according to Embodiment 4 of the present invention.

Next, an electric-power conversion apparatus according to Embodiment 4 of the present invention will be explained. FIG. 13 is an overall configuration diagram of the electric-power conversion apparatus according to Embodiment 4 of the present invention. The electric-power conversion apparatus according to Embodiment 4, represented in FIG. 13, differs from the electric-power conversion apparatus according to Embodiment 1, represented in foregoing FIG. 1, in a first coordinate converter 101a, a second coordinate converter 101b, a subtractor 102, and a basic command calculation unit 6b. The first coordinate converter 101a, the second coordinate converter 101b, the subtractor 102, the basic command calculation unit 6b, the offset voltage calculation unit 7a, and the corrected three-phase voltage command calculation unit 8a are included in a control apparatus in the electric-power conversion apparatus; the control apparatus is configured with a microcomputer that operates based on a predetermined program. In the following explanation, the descriptions for the parts that overlap with those in Embodiment 1 will be omitted.

In FIG. 13, the first coordinate converter 101a calculates current detection values $I\alpha 1$ and $I\beta 1$ on stationary two axes, based on the corrected U-phase voltage command Vu, the corrected V-phase voltage command Vv, and the corrected W-phase voltage command Vw, as the corrected three-phase voltage commands, and the U-phase current detection value Iu, the V-phase current detection value Iv, the W-phase current detection value Iw, as the current detection values.

The second coordinate converter 101b calculates current detection values $I\alpha 2$ and $I\beta 2$ on the stationary two axes, based on the corrected U-phase voltage command Vu, the corrected V-phase voltage command Vv, the corrected W-phase voltage command Vw, the U-phase current detection value Iu, the V-phase current detection value Iv, and the U-phase current detection value Iw.

The subtractor 102 performs correction calculation of current detection values $I\alpha c$ and $I\beta c$ on the stationary two axes by subtracting the current detection values $I\alpha 2$ and $I\beta 2$ on the stationary two axes, outputted from the second coordinate converter 101b, from the current detection values $I\alpha 1$ and $I\beta 1$, respectively, on the stationary two axes, outputted from the first coordinate converter 101a.

Based on the current detection values $I\alpha c$ and $I\beta c$ on the stationary two axes, the basic command calculation unit 6b calculates the U-phase voltage command Vub, the V-phase voltage command Vvb, and the W-phase voltage command Vwb, as the three-phase voltage commands, related to the voltages that are applied by the three-phase inverter 3 so as to drive the three-phase AC rotating electric machine Next, the first coordinate converter 101a will be explained. In accordance with the values of the corrected U-phase voltage command Vu, the corrected V-phase voltage command Vv, and the corrected W-phase voltage command $V_w$, as the corrected three-phase voltage commands, the first coordinate converter 101a calculates current detection values $I\alpha 1$ and $I\beta 1$ on the stationary two axes by performing coordinate conversion, based on the current detection value related to the phase where the lower-arm switching device is turned on at the detection time point t2 for the U-phase current detection value Iu, the V-phase current detection value Iv, and the W-phase current detection value Iw.

For example, when it is assumed that the magnitude relationship among the corrected three-phase voltage commands is Vu>Vv>Vw, the upper-arm switching device is turned on in the U phase and the lower-arm switching device is turned on in each of the V Phase and the W phase at the time point t2; thus, the first coordinate converter 101a performs conversion into the current detection values $I\alpha 1$ and $I\beta 1$ on the stationary two axes, by use of the V-phase current detection value Iv, the W-phase current detection value Iw, and the U-phase current detection value Iu calculated as the sum of the sign inverted value of the V-phase current detection value Iv and the sign inverted value of the W-phase current detection value Iw.

Subsequently, the second coordinate converter 101b will be explained. In accordance with the values of the corrected U-phase voltage command Vu, the corrected V-phase voltage command Vv, and the corrected W-phase voltage command Vw, as the corrected three-phase voltage commands, the second coordinate converter 101b calculates the current detection values $I\alpha 2$ and $I\beta 2$ on the stationary two axes by performing coordinate conversion, based on the current detection value related to the phase where the upper-arm switching device is turned on at the detection time point t2 for the U-phase current detection value Iu, the V-phase current detection value Iv, and the W-phase current detection value Iw.

For example, when it is assumed that the magnitude relationship among the corrected voltage commands is Vu>Vv>Vw, the upper-arm switching device is turned on in the U phase and the lower-arm switching device is turned on in each of the V Phase and the W phase at the time point t2; thus, a coordinate converter 102a performs conversion into the current detection values $I\alpha 2$ and $I\beta 2$ on the stationary two axes, by utilizing only the U-phase current detection value Iu and by setting the V-phase current detection value Iv and the U-phase current detection value Iw to zero. Because the coordinate converter 101b utilizes only the current detection value of the phase where upper-arm switching device is turned on, the current detection values $I\alpha 2$ and $I\beta 2$ on the stationary two axes are equal to the respective values of observation noise signals on the stationary two axes.

The subtractor 102 performs correct by subtracting the current detection values $I\alpha 2$ and $I\beta 2$ on the stationary two axes, outputted from the second coordinate converter 101b, from the current detection values Iα1 and Iβ1, respectively, on the stationary two axes, outputted from the first coordinate converter 101*a*, so that there can be obtained the current detection values Iαc and Iβc on the stationary two axes, in each of which the observation noise is reduced.

Next, there will be described the calculation method in which the basic command calculation unit 6*b* calculates the U-phase voltage command Vub, the V-phase voltage command Vvb, and the W-phase voltage command Vwb, as the three-phase voltage commands. There is utilized a technology such as current feedback control in which as the control commands Com from the outside, the current commands Id_ref and Iq_ref on the rotating two axes of the three-phase AC rotating electric machine 1 are set, and then based on the differences between the control commands Com and the currents Idc and Iqc obtained by coordinate-converting the current detection values Iαc and Iβc on the stationary two axes outputted from the subtractor 102 into the values on the rotating two axes of the three-phase AC rotating electric machine 1, the U-phase voltage command Vub, the V-phase voltage command Vvb, and the W-phase voltage command Vwb, as the three-phase voltage commands, are calculated through proportional integration control for making the differences become zero.

In the electric-power conversion apparatus according to Embodiment 4 of the present invention, the first coordinate converter 101*a*, the second coordinate converter 101*b*, and the subtractor 102 have been explained at a time when the current detection values are on the stationary two axes (α–β); however, it goes without saying that the coordinate conversion into the current detection values on the rotating two axes (d-q axes) can also realize the calculation of the three-phase voltage commands.

In the case where in the current detector 4, the respective current detection resistors Ru, Rv, and Rw are provided in series with the U-phase upper arm switching device Sup, the V-phase upper arm switching device Svp, and the W-phase upper arm switching device Swp of the three-phase inverter 3, it goes without saying that the calculation of the three-phase voltage commands can also be realized by correcting the current values, obtained by converting the current detection values of the phase where the upper-arm switching device is turned on into the ones on the two axes, with the current values, obtained by converting the current detection values of the phase where the lower-arm switching device is turned on into the ones on the two axes.

Embodiment 5

Figure 14:
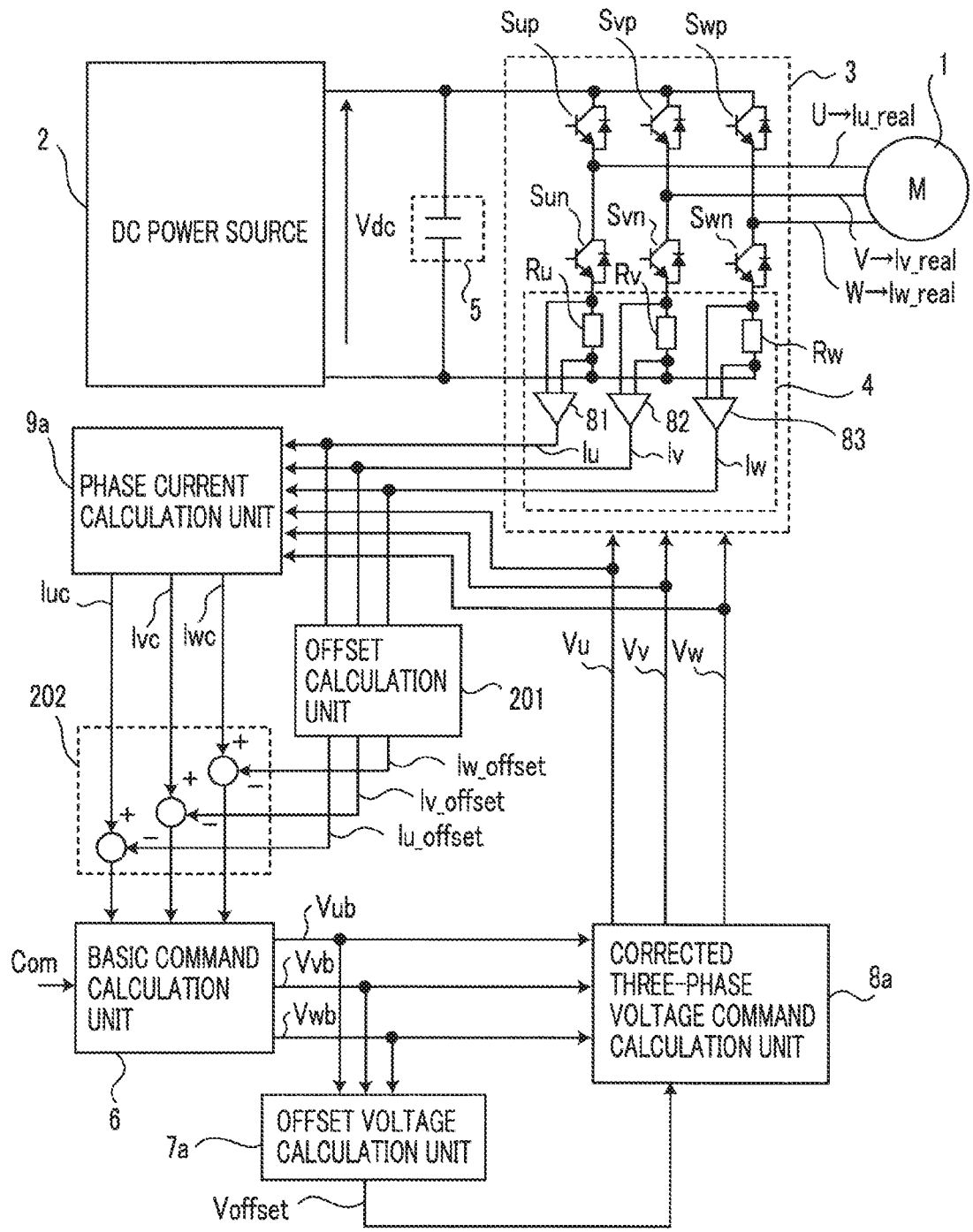
FIG. 14 is an overall configuration diagram of an electric-power conversion apparatus according to Embodiment 5 of the present invention.

Next, an electric-power conversion apparatus according to Embodiment 5 of the present invention will be explained. FIG. 14 is an overall configuration diagram of the electric-power conversion apparatus according to Embodiment 5 of the present invention. The electric-power conversion apparatus according to Embodiment 5, represented in FIG. 14, differs from the electric-power conversion apparatus according to Embodiment 1, represented in foregoing FIG. 1, in an offset calculation unit 201 and subtractor 202. The offset calculation unit 201, the subtractor 202, the basic command calculation unit 6, the offset voltage calculation unit 7*a*, the corrected three-phase voltage command calculation unit 8*a*, and the phase current calculation unit 9*a* are included in a control apparatus in the electric-power conversion apparatus; the control apparatus is configured with a microcomputer that operates based on a predetermined program. In the following explanation, the descriptions for the parts that overlap with those in Embodiment 1 will be omitted.

In FIG. 14, the offset calculation unit 201 outputs, as a U-phase offset current value Iu_offset, a V-phase offset current value Iv_offset, and a W-phase offset current value Iw_w offset, the U-phase current detection value the Iu, the V-phase current detection value Iv, and the W-phase current detection value Iw, respectively, at a time point when there occurs the foregoing voltage vector V7 in which all of the U-phase upper arm switching device Sup, the V-phase upper arm switching device Svp, and the W-phase upper arm switching device Swp turn on.

The subtractor 202 subtracts the U-phase offset current value Iu_offset, the V-phase offset current value Iv_offset, and the W-phase offset current value Iw_offset from the corrected U-phase current detection value Iuc, the corrected V-phase current detection value Ivc, and the corrected W-phase current detection value Iwc, respectively, as the corrected current detection value, that are outputted from the phase current calculation unit 9*a*, and then outputs the reduced current detection values to the basic command calculation unit 6.

Next, the effect produced by introducing the offset calculation unit 201 will be explained. The U-phase current detection value Iu, the V-phase current detection value Iv, and the W-phase current detection value Iw include offset components caused by the temperature drift in the first amplifier 81, the second amplifier 82, and the third amplifier 83, respectively, in addition to the observation noise Inoise. Because due to the temperature drift, the U-phase current detection value Iu, the V-phase current detection value Iv, and the W-phase current detection value Iw each include an offset, an electric-angle first-order torque ripple, a noise sound, and a vibration are caused in the three-phase AC rotating electric machine 1. When paying attention to the fact that the current detection value at a time point when the upper-arm switching devices of all the phases are turned on is equal to the offset component, the corrected U-phase current detection value Iuc, the corrected V-phase current detection value Ivc, and the corrected W-phase current detection value Iwc are corrected in the subtractor 202, there is demonstrated an unprecedented prominent effect that not only the observation noise but also offset components caused by the temperature drift in each of the first amplifier 81, the second amplifier 82, and the third amplifier 83 can be corrected.

In the case where in the current detector 4, the respective current detection resistors Ru, Rv, and Rw are provided in series with the U-phase upper arm switching device Sup, the V-phase upper arm switching device Svp, and the W-phase upper arm switching device Swp of the three-phase inverter 3, it goes without saying that when at a timing when there occurs the foregoing voltage vector V0 in which the U-phase lower arm switching device Sun, the V-phase lower arm switching device Svn, and the W-phase lower arm switching device Swn turn on, the U-phase offset current Iu_offset, the V-phase offset current Iv_offset, and the W-phase offset current Iw_offset are detected, and then a calculation for correcting the corrected U-phase current detection value Iuc, the corrected V-phase current detection value Ivc, and the corrected W-phase current detection value Iwc is performed, the same effect can be obtained.

The present invention is not limited to the electric-power conversion apparatus according to any one of Embodiments 1 through 5; in the scope within the spirits of the present invention, the configurations described in Embodiments 1 through 5 can appropriately be combined with one another, can partially be modified, or can partially be omitted.

INDUSTRIAL APPLICABILITY

This invention can be applied not only to the field of an electric-power conversion apparatus for performing electric-power conversion between DC electric power and AC electric power but also to the field utilizing the electric-power conversion apparatus.

DESCRIPTION OF REFERENCE NUMERALS

1: three-phase AC rotating electric machine
2: DC power source
3: three-phase inverter
4: current detector
5: smoothing capacitor
6, 6b: basic command calculation unit
7a: offset voltage calculation unit
8a: corrected three-phase voltage command calculation unit
9a: phase current calculation unit
101a: first coordinate converter
101b: second coordinate converter
102: subtractor
201: offset calculation unit
202: subtractor

The invention claimed is:

1. An electric-power conversion apparatus comprising:
a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device;
a current detector that detects a current flowing in the lower-arm switching device of each of the three phases in the three-phase inverter and then outputs a current detection value corresponding to the current; and
a control apparatus that performs PWM control of the upper-arm switching device and the lower-arm switching device in the three-phase inverter, based on the current detection value outputted from the current detector,
wherein the current detector detects the current and then outputs the current detection value at a time when there occurs an effective voltage vector in which the switching device of one phase or the switching devices of two phases in one group of the upper-arm switching devices and the lower-arm switching devices of the respective phases in the three-phase inverter are turned on or in which the switching devices of two phases or the switching device of one phase in the other group of the upper-arm switching devices and the lower-arm switching devices of the respective phases in the three-phase inverter are turned on, and
wherein the control apparatus is configured to:
when respective voltage commands of the three phases for providing a command of the voltage are classified into a maximum-phase voltage command, a middle-phase voltage command, and a minimum-phase voltage command in that decreasing order, substantially equally shifting the maximum-phase voltage command, the middle-phase voltage command, and the minimum-phase voltage command so that the maximum-phase voltage command coincides with the maximum value of a PWM carrier signal in the PWM control, and then controlling the voltage based on comparisons between the PWM carrier signal in the PWM control and the maximum-phase voltage command, the middle-phase voltage command, and the minimum-phase voltage command that have been shifted, and
correct the current detection value corresponding to the phase where the lower-arm switching device is turned on based on the current detection value corresponding to the phase where the upper-arm switching device is turned on.

2. The electric-power conversion apparatus according to claim 1, wherein the current detector detects the current at a time point when the PWM carrier signal takes its maximum value, and then outputs the current detection value.

3. An electric-power conversion apparatus comprising:
a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device;
a current detector that detects a current flowing in the lower-arm switching device of each of the three phases in the three-phase inverter and then outputs a current detection value corresponding to the current; and
a control apparatus that performs PWM control of the upper-arm switching device and the lower-arm switching device in the three-phase inverter, based on the current detection value outputted from the current detector,
wherein when respective voltage commands of the three phases for providing a command of the voltage are classified into a maximum-phase voltage command, a middle-phase voltage command, and a minimum-phase voltage command in that decreasing order, the current detector detects the current and then outputs the current detection value at a time point when there occurs an effective voltage vector in which the upper-arm switching device, in the three-phase inverter, that corresponds to the maximum-phase voltage command is turned on and the respective lower-arm switching devices corresponding to the middle-phase voltage command and the minimum-phase voltage command are turned on, and
wherein the control apparatus is configured to control the voltage, based on comparisons between a PWM carrier signal in the PWM control and the respective voltage commands of three phases for providing a command of the voltage, and to correct the current detection value corresponding to the middle-phase voltage command and the current detection value corresponding to the minimum-phase voltage command, based on the current detection value corresponding to the maximum-phase voltage command.

4. An electric-power conversion apparatus comprising:
a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device;

a current detector that detects a current flowing in the lower-arm switching device of each of the three phases in the three-phase inverter and then outputs a current detection value corresponding to the current; and a control apparatus that performs PWM control of the upper-arm switching device and the lower-arm switching device in the three-phase inverter, based on the current detection value outputted from the current detector, wherein when respective voltage commands of the three phases for providing a command of the voltage are classified into a maximum-phase voltage command, a middle-phase voltage command, and a minimum-phase voltage command in that decreasing order, the current detector detects the current and then outputs the current detection value at a time point when there occurs an effective voltage vector in which the respective upper-arm switching devices corresponding to the maximum-phase voltage command and the middle-phase voltage command are turned on and the lower-arm switching device corresponding to the minimum-phase voltage command is turned on, and wherein the control apparatus corrects the current detection value corresponding to the minimum-phase voltage command with the current detection value corresponding to the maximum-phase voltage command or the middle-phase voltage command.

5. The electric-power conversion apparatus according to claim 1, wherein the control apparatus has a first coordinate converter that converts the current detection value corresponding to the phase where the lower-arm switching device is turned on into values on two axes and a second coordinate converter that converts the current detection value corresponding to the phase where the upper-arm switching device is turned on into values on the two axes, and corrects the current detection value outputted from the first coordinate converter, based on the current detection value outputted from the second coordinate converter.

6. The electric-power conversion apparatus according to claim 3, wherein the control apparatus has a first coordinate converter that converts the current detection value corresponding to the phase where the lower-arm switching device is turned on into values on two axes and a second coordinate converter that converts the current detection value corresponding to the phase where the upper-arm switching device is turned on into values on the two axes, and corrects the current detection value outputted from the first coordinate converter, based on the current detection value outputted from the second coordinate converter.

7. The electric-power conversion apparatus according to claim 4, wherein the control apparatus has a first coordinate converter that converts the current detection value corresponding to the phase where the lower-arm switching device is turned on into values on two axes and a second coordinate converter that converts the current detection value corresponding to the phase where the upper-arm switching device is turned on into values on the two axes, and corrects the current detection value outputted from the first coordinate converter, based on the current detection value outputted from the second coordinate converter.

8. The electric-power conversion apparatus according to claim 3,
wherein the current detector detects the current detection value for each of the three phases at a time point when the upper-arm switching device is turned on, and
wherein the control apparatus corrects the current detection value, for each of the three phases, that is detected at a time point when the effective voltage vector occurs.

9. The electric-power conversion apparatus according to claim 4,
wherein the current detector detects the current detection value for each of the three phases at a time point when the upper-arm switching device is turned on, and
wherein the control apparatus corrects the current detection value, for each of the three phases, that is detected at a time point when the effective voltage vector occurs.

10. An electric-power conversion apparatus comprising:
two three-phase inverters that apply respective voltages to two sets of three-phase windings in a three-phase AC rotating electric machine having the two sets of three-phase windings and that is provided with an upper-arm switching device and a lower-arm switching device connected in series with each other for each of three phases;

a current detector that detects a current flowing in the lower-arm switching device of each of the three phases in each of the two three-phase inverters and then outputs a current detection value corresponding to the current; and a control apparatus that performs PWM control of the upper-arm switching devices and the lower-arm switching devices in the two three-phase inverters, based on the current detection values outputted from the current detector, wherein for each of the two three-phase inverters, an upper-arm switching device and a lower-arm switching device connected in series with each other are provided for each of three phases, a DC power source is connected across the upper-arm switching device and the lower-arm switching device connected in series with each other, and a voltage is applied to a three-phase AC rotating electric machine connected with a series connection portion between the upper-arm switching device and the lower-arm switching device, wherein the current detector detects the current and then outputs the current detection value during a time in which there occurs an effective voltage vector in which the switching device of one phase or the switching devices of two phases in one group of the upper-arm switching devices and the lower-arm switching devices of the respective phases in each of the two three-phase inverter are turned on or in which the switching devices of two phases or the switching device of one phase in the other group of the upper-arm switching devices and the lower-arm switching devices of the respective phases in the three-phase inverter are turned on, and wherein the control apparatus corrects the current detection value corresponding to the phase where the lower-arm switching device in one of the two three-phase inverters is turned on, based on the current detection value corresponding to the phase where the upper-arm switching device in the other one of the two three-phase inverters is turned on.

11. An electric-power conversion apparatus comprising:
a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device;

a current detector that detects a current flowing in the lower-arm switching device of each of the three phases in the three-phase inverter and then outputs a current detection value corresponding to the current; and a control apparatus that performs PWM control of the upper-arm switching device and the lower-arm switching device in the three-phase inverter, based on the current detection value outputted from the current detector, wherein the current detector detects the current and then outputs the current detection value at a time when there occurs an effective voltage vector in which the switching device of one phase or the switching devices of two phases in one group of the upper-arm switching devices and the lower-arm switching devices of the respective phases in the three-phase inverter are turned on or in which the switching devices of two phases or the switching device of one phase in the other group of the upper-arm switching devices and the lower-arm switching devices of the respective phases in the three-phase inverter are turned on, and wherein the control apparatus is configured to:
when respective voltage commands of the three phases for providing a command of the voltage are classified into a maximum-phase voltage command, a middle-phase voltage command, and a minimum-phase voltage command in that decreasing order, substantially equally shifting the maximum-phase voltage command, the middle-phase voltage command, and the minimum-phase voltage command so that the minimum-phase voltage command coincides with the minimum value of a PWM carrier signal in the PWM control, and then controlling the voltage based on comparisons between the PWM carrier signal in the PWM control and the middle-phase voltage command and the minimum-phase voltage command that have been shifted, and correct the current detection value corresponding to the phase where the upper-arm switching device is turned on based on the current detection value corresponding to the phase where the lower-arm switching device is turned on.

12. The electric-power conversion apparatus according to claim 11, wherein the current detector detects the current at a time point when the PWM carrier signal takes its minimum value, and then outputs the current detection value.

13. An electric-power conversion apparatus comprising:
a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device;

a current detector that detects a current flowing in the lower-arm switching device of each of the three phases in the three-phase inverter and then outputs a current detection value corresponding to the current; and a control apparatus that performs PWM control of the upper-arm switching device and the lower-arm switching device in the three-phase inverter, based on the current detection value outputted from the current detector, wherein when respective voltage commands of the three phases for providing a command of the voltage are classified into a maximum-phase voltage command, a middle-phase voltage command, and a minimum-phase voltage command in that decreasing order, the current detector detects the current and then outputs the current detection value at a time point when there occurs an effective voltage vector in which the lower-arm switching device corresponding to the minimum-phase voltage command is turned on and the respective upper-arm switching devices corresponding to the middle-phase voltage command and the maximum-phase voltage command are turned on, and wherein the control apparatus corrects the current detection value corresponding to the middle-phase voltage command and the current detection value corresponding to the maximum-phase voltage command, based on the current detection value corresponding to the minimum-phase voltage command.

14. An electric-power conversion apparatus comprising:
a three-phase inverter in which an upper-arm switching device and a lower-arm switching device connected in series with each other are provided for each of three phases, in which a DC power source is connected across the upper-arm switching device and the lower-arm switching device connected in series with each other, and in which a voltage is applied to a three-phase AC rotating electric machine connected with a series connection portion between the upper-arm switching device and the lower-arm switching device;

a current detector that detects a current flowing in the lower-arm switching device of each of the three phases in the three-phase inverter and then outputs a current detection value corresponding to the current; and a control apparatus that performs PWM control of the upper-arm switching device and the lower-arm switching device in the three-phase inverter, based on the current detection value outputted from the current detector, wherein when respective voltage commands of the three phases for providing a command of the voltage are classified into a maximum-phase voltage command, a middle-phase voltage command, and a minimum-phase voltage command in that decreasing order, the current detector detects the current and then outputs the current detection value at a time point when there occurs an effective voltage vector in which the respective lower-arm switching devices corresponding to the minimum-phase voltage command and the middle-phase voltage command are turned on and the upper-arm switching device corresponding to the maximum-phase voltage command is turned on, and wherein the control apparatus corrects the current detection value corresponding to the maximum-phase voltage command, based on the current detection value corresponding to the minimum-phase voltage command or the middle-phase voltage command.

15. The electric-power conversion apparatus according to claim 11, wherein the control apparatus has a third coordinate converter that converts the current detection value corresponding to the phase where the upper-arm switching device is turned on into values on two axes and a fourth coordinate converter that converts the current detection value corresponding to the phase where the lower-arm switching device is turned on into values on the two axes, and corrects the current detection value outputted from the third coordinate converter, based on the current detection value outputted from the fourth coordinate converter.

16. The electric-power conversion apparatus according to claim 13, wherein the control apparatus has a third coordinate converter that converts the current detection value corresponding to the phase where the upper-arm switching device is turned on into values on two axes and a fourth coordinate converter that converts the current detection value corresponding to the phase where the lower-arm switching device is turned on into values on the two axes, and corrects the current detection value outputted from the third coordinate converter, based on the current detection value outputted from the fourth coordinate converter.

17. The electric-power conversion apparatus according to claim 14, wherein the control apparatus has a third coordinate converter that converts the current detection value corresponding to the phase where the upper-arm switching device is turned on into values on two axes and a fourth coordinate converter that converts the current detection value corresponding to the phase where the lower-arm switching device is turned on into values on the two axes, and corrects the current detection value outputted from the third coordinate converter, based on the current detection value outputted from the fourth coordinate converter.

18. The electric-power conversion apparatus according to claim 11,
wherein the current detector detects the current and then outputs the current detection value for each of the three phases at a time point when the lower-arm switching device of each of the three phases is turned on, and
wherein the control apparatus corrects the current detection value, for each of the three phases, that is detected at a time point when the effective voltage vector occurs.

19. The electric-power conversion apparatus according to claim 13,
wherein the current detector detects the current and then outputs the current detection value for each of the three phases at a time point when the lower-arm switching device of each of the three phases is turned on, and
wherein the control apparatus corrects the current detection value, for each of the three phases, that is detected at a time point when the effective voltage vector occurs.

20. An electric-power conversion apparatus comprising:
two three-phase inverters that apply respective voltages to two sets of three-phase windings in a three-phase AC rotating electric machine having the two sets of three-phase windings;
a current detector that detects a current flowing in the upper-arm switching device of each of the three phases in each of the two three-phase inverters and then outputs a current detection value corresponding to the current; and
a control apparatus that performs PWM control of the upper-arm switching devices and the lower-arm switching devices in the two three-phase inverters, based on the current detection values outputted from the current detector,
wherein for each of the two three-phase inverters, an upper-arm switching device and a lower-arm switching device connected in series with each other are provided for each of three phases, a DC power source is connected across the upper-arm switching device and the lower-arm switching device connected in series with each other, and a voltage is applied to a three-phase AC rotating electric machine connected with a series connection portion between the upper-arm switching device and the lower-arm switching device,
wherein the current detector detects the current and then outputs the current detection value during a time in which there occurs an effective voltage vector in which the switching device of one phase or the switching devices of two phases in the upper-arm switching devices of the respective phases in each of the two three-phase inverter are turned on or in which the switching devices of two phases or the switching device of one phase in the lower-arm switching devices of the respective phases in the three-phase inverter are turned on, and
wherein the control apparatus corrects the current detection value corresponding to the phase where the upper-arm switching device in one of the two three-phase inverters is turned on, based on the current detection value corresponding to the phase where the lower-arm switching device in the other one of the two three-phase inverters is turned on.

* * * * *